United States Patent
Nakamura et al.

(10) Patent No.: US 7,665,378 B2
(45) Date of Patent: Feb. 23, 2010

(54) ELECTRIC POWER STEERING APPARATUS

(75) Inventors: Kensaku Nakamura, Kashiba (JP);
Nicolas Plataret, Kashihara (JP); Hiroki Yamahana, Kashiba (JP)

(73) Assignee: JTEKT Corporation, Osaka (JP)

( * ) Notice: Subject to any disclaimer, the term of this patent is extended or adjusted under 35 U.S.C. 154(b) by 358 days.

(21) Appl. No.: 11/819,323

(22) Filed: Jun. 26, 2007

(65) Prior Publication Data

US 2008/0006471 A1  Jan. 10, 2008

(30) Foreign Application Priority Data

Jun. 27, 2006  (JP) ............... 2006-176867

(51) Int. Cl.
*F16H 35/06* (2006.01)
*F16H 55/18* (2006.01)
*F16H 57/12* (2006.01)

(52) U.S. Cl. .............. 74/388 PS; 74/409; 74/392; 74/397

(58) Field of Classification Search .......... 74/409, 74/388 PS, 392, 395, 396, 397
See application file for complete search history.

(56) References Cited

U.S. PATENT DOCUMENTS

| | | | | |
|---|---|---|---|---|
| 2,021,935 A | * | 11/1935 | Griswold | ............ 74/397 |
| 5,540,112 A | | 7/1996 | Baker et al. | |
| 5,686,197 A | * | 11/1997 | Nishida et al. | ............ 429/30 |
| 6,129,171 A | | 10/2000 | Takaoka et al. | |
| 7,284,634 B2 | * | 10/2007 | Tatewaki et al. | ........ 180/444 |
| 2005/0121251 A1 | | 6/2005 | Ueno et al. | |

FOREIGN PATENT DOCUMENTS

| | | |
|---|---|---|
| JP | 10-278813 | 10/1998 |
| SU | 521 419 A1 | 7/1976 |
| WO | WO 98/02343 | 1/1998 |

* cited by examiner

*Primary Examiner*—Thomas R Hannon
*Assistant Examiner*—Terence Boes
(74) *Attorney, Agent, or Firm*—Rabin & Berdo, PC

(57) ABSTRACT

An electric power steering apparatus includes a transmission mechanism for transmitting an output from an electric motor for steering assist to a steering mechanism. The transmission mechanism includes a driving gear, an intermediate gear and a driven gear. An eccentric mechanism for eccentrically locating the intermediate gear is provided in order that a center axis of the intermediate gear is moved toward at least one of the axes of the driving gear and the driven gear while maintaining a parallel relation. The eccentric mechanism includes an intermediate-gear support shaft having a center axis. The intermediate-gear support shaft is supported by first and second circle holes in a manner to be rotatable about the center axis thereof for adjustment of a rotational position thereof, the first and second circle holes have their center axes aligned coaxially with each other. The intermediate gear is rotatably supported by an eccentric portion provided at an outer periphery of the intermediate-gear support shaft. The eccentric portion includes a cylindrical surface eccentric relative to the center axis of the intermediate-gear support shaft.

12 Claims, 19 Drawing Sheets

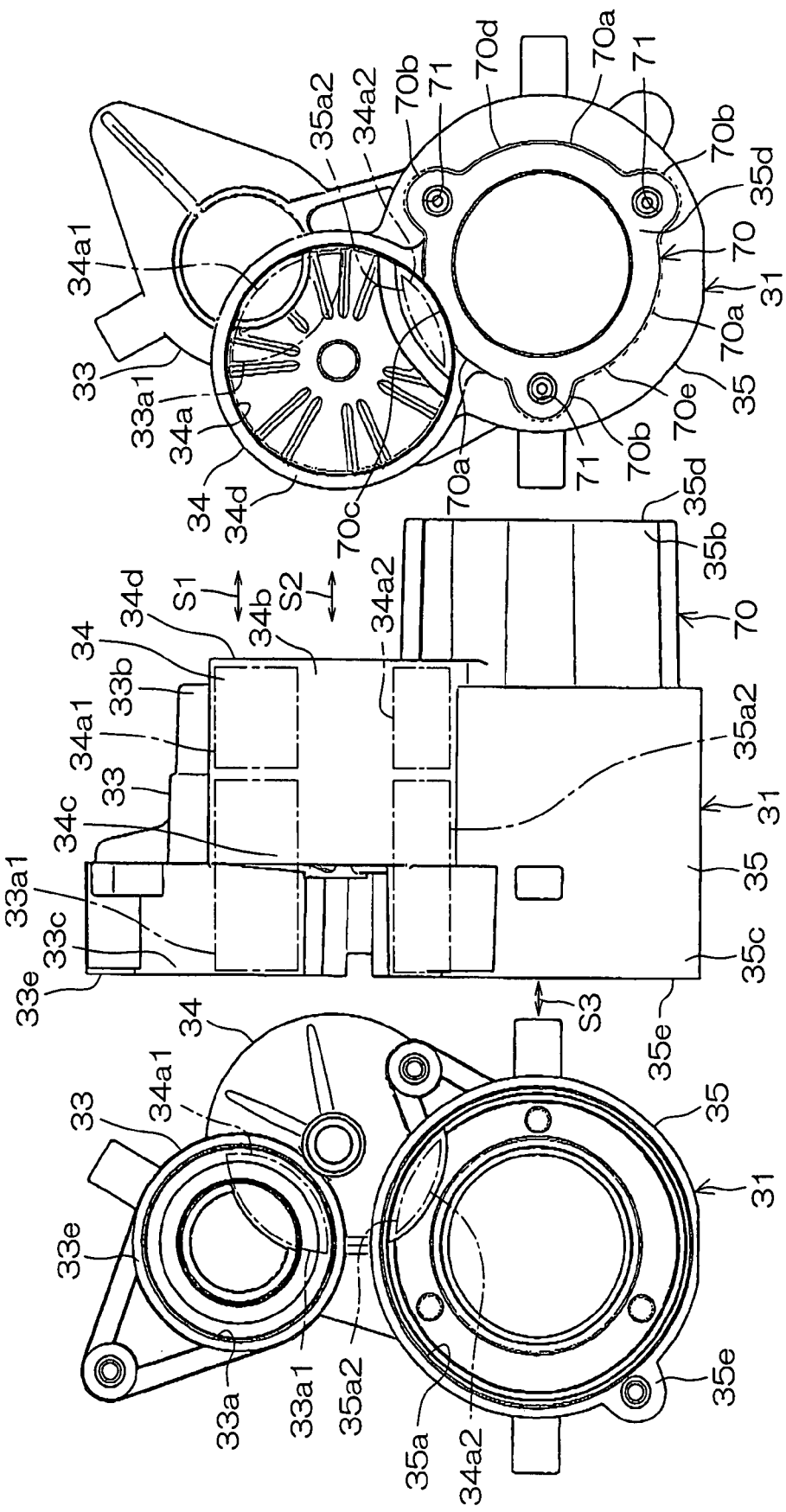

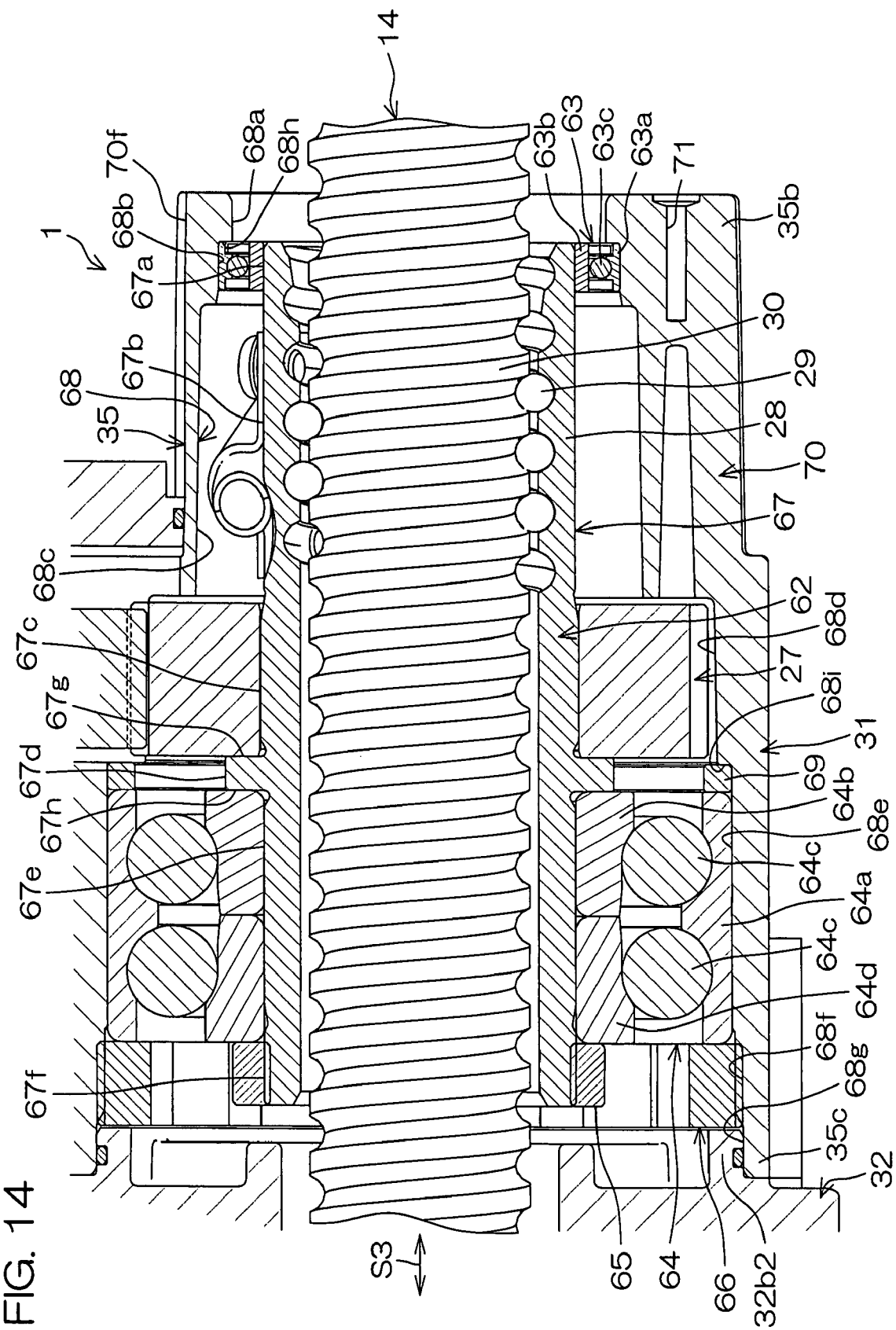

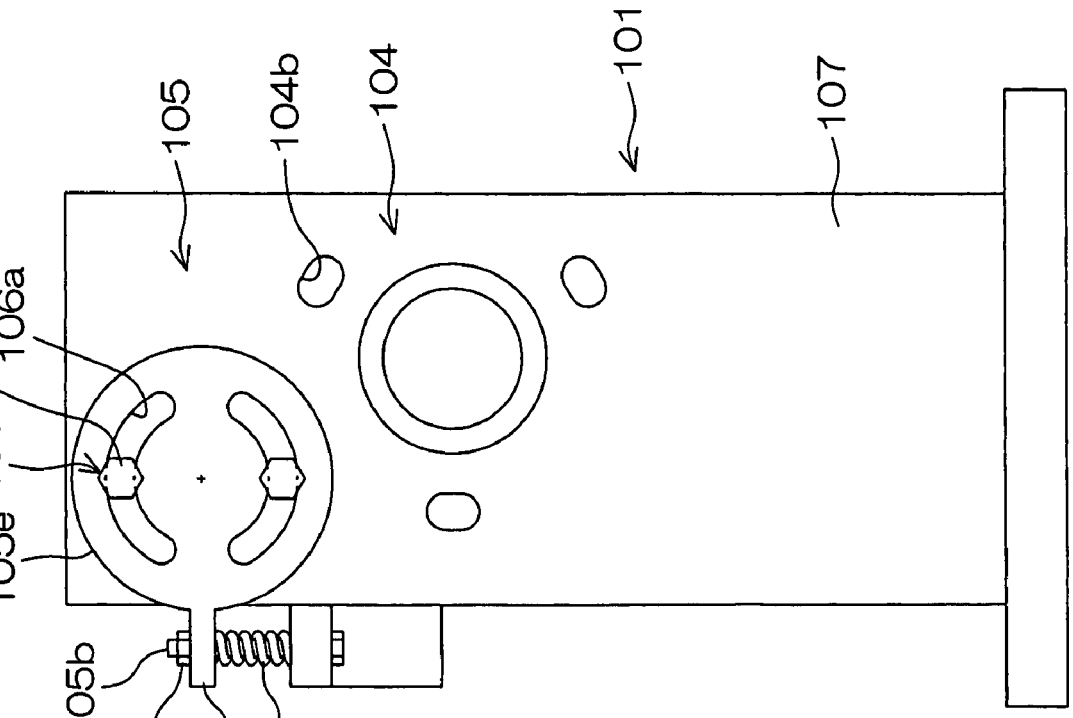
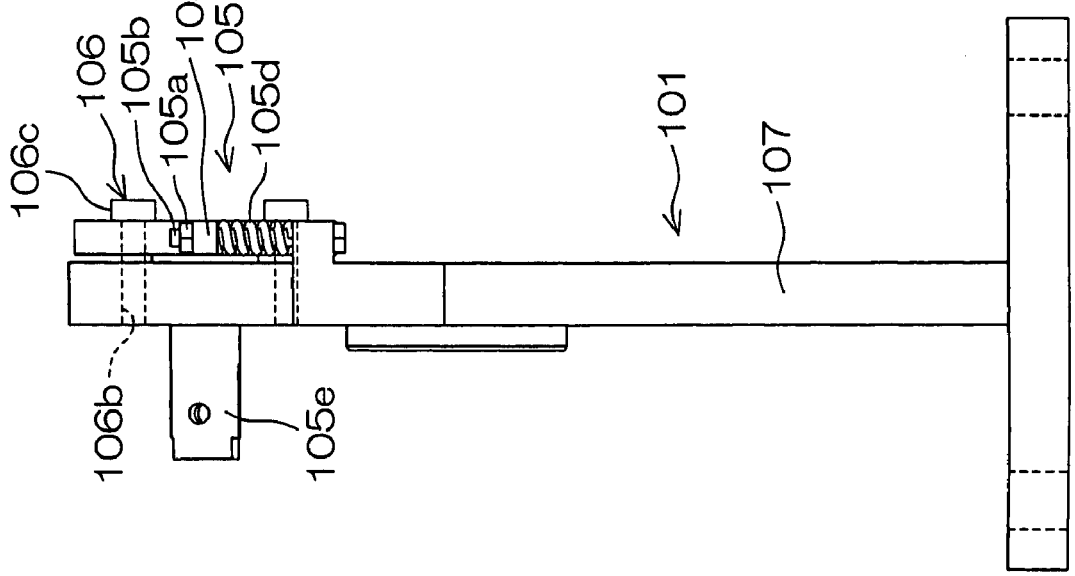

ELECTRIC POWER STEERING APPARATUS

BACKGROUND OF THE INVENTION

1. Field of the Invention

The present invention relates to an electric power steering apparatus.

2. Description of Related Art

The electric power steering apparatuses include a so-called rack parallel type. In the electric power steering apparatus of this type, an electric motor for steering assist is mounted to a housing of a steering mechanism and an output shaft of the electric motor is disposed in parallel to a rack bar of the steering mechanism. A rotary driving force of the electric motor, as a steering assist force, is transmitted to a ball screw mechanism via three gears sequentially meshed with each other, that is a first gear, a second gear and a third gear in this order. Then, the driving force is transmitted to the rack bar (see, for example, Patent Document 1: Japanese Unexamined Patent Publication No. 10-278813).

According to the above document 1, the housing comprises first, second and third housings. The first gear is supported by the first and second housings. The second gear is supported by the first housing in a position-adjustable manner such as to adjust gear-to-gear backlash. The third gear is supported by the third housing.

The following problem arises if the gear-to-gear backlash is significant. When a vehicle is traveling straight on a rough road so that the individual gears do not transmit the power, for example, noises of gear rattling occur due to the influence of reaction force (inverse input) from the road surface.

According to Document 1, a support shaft supporting an intermediate gear is fitted in an elongate hole of the first housing to adjust backlash. However, a clearance tends to be formed between an outer periphery of the support shaft and an inner periphery of the elongate hole. Because of the influence of the clearance, the support shaft is decreased in support rigidity, involving likelihood of increasing gear alignment errors. Specifically, the center axes of the three gears are prone to incline relative to each other.

The large gear alignment errors lead to the following problem. Specifically, the teeth of gears meshed with each other for transmitting power during a steering operation tend to slide easily on each other. This results in the increase of noises caused by the gear sliding noises.

It may be possible to adopt a so-called matching assembly in order to reduce the gear alignment errors and the backlash between each pair of gears. Specifically, the individual parts of the first, second and third gears and of the first, second and third housings are sorted out according to respective degrees of dimensional accuracy variation so that parts with proper accuracies are assembled to each other.

However, the matching assembly requires much labor and time for sorting out the individual parts, resulting in increased manufacture costs.

The invention seeks to provide an electric power steering apparatus to reduce noises and assemble easily.

SUMMARY OF THE INVENTION

In accordance with a preferred embodiment of the invention, an electric power steering apparatus comprises an electric motor for steering assist, and a transmission mechanism for transmitting an output from the electric motor to a steering mechanism. The transmission mechanism includes: a driving gear having a center axis; a driven gear having a center axis; and an intermediate gear meshed with the driving gear and with the driven gear. The intermediate gear has a center axis disposed in parallel to the center axis of the driving gear and the center axis of the driven gear. The above electric power steering apparatus comprises: a housing accommodating the transmission mechanism therein; and an eccentric mechanism for eccentrically locating the intermediate gear in order that the center axis of the intermediate gear is moved toward at least one of the center axis of the driving gear and the center axis of the driven gear while maintaining the parallel relation. The housing is formed with first and second circle holes. The first and second circle holes have center axes aligned with each other. The eccentric mechanism includes an intermediate-gear support shaft having a center axis. The intermediate-gear support shaft is supported by the first and second circle holes in a manner to be rotatable about the center axis of the intermediate-gear support shaft for adjustment of a rotational position thereof. The intermediate-gear support shaft includes an outer periphery. The outer periphery of the intermediate-gear support shaft includes an eccentric portion comprising a cylindrical surface eccentric to the center axis of the intermediate-gear support shaft. The intermediate gear is rotatably supported by the eccentric portion.

According to the embodiment, the eccentric mechanism is adapted to move the center axis of the intermediate gear in parallel to at least one of the center axis of the driving gear and the center axis of the driven gear. This provides the adjustment of backlash between at least one of the driving gear and the driven gear and the intermediate gear, for example, so that the backlash can be optimized. Accordingly, the occurrence of the rattling noises caused to the backlash may be prevented.

The intermediate-gear support shaft is supported by the first and second circle holes having their center axes aligned coaxially with each other. Therefore, the individual center axes of these gears are less prone to incline to each other, as compared with the conventional case where the support shaft is supported by means of the elongate hole. Thus, the gears in meshing engagement may be reduced in the gear sliding noises.

The occurrence of the rattling noises and the gear sliding noises may be avoided by merely adjusting the rotational position of the intermediate-gear support shaft. Therefore, the embodiment can achieve a much more notable reduction of manufacturing time and labor as compared with the conventional matching assembly process.

BRIEF DESCRIPTION OF THE DRAWINGS

FIG. 9A, FIG. 9B and FIG. 9C are views showing a left side elevation, a front elevation and a right side elevation, respectively, of a housing body of the second housing shown in FIG. 3;

FIG. 14 is an enlarged view of the principal part of FIG. 5, mainly showing a driven gear;

FIG. 17A and FIG. 17B are a front elevation and a side elevation, respectively, of the adjusting jig shown in FIG. 16;

DETAILED DESCRIPTION OF THE PREFERRED EMBODIMENT

A preferred embodiment of the invention will hereinbelow be described in larger details with reference to the accompanying drawings.

Figure 1:
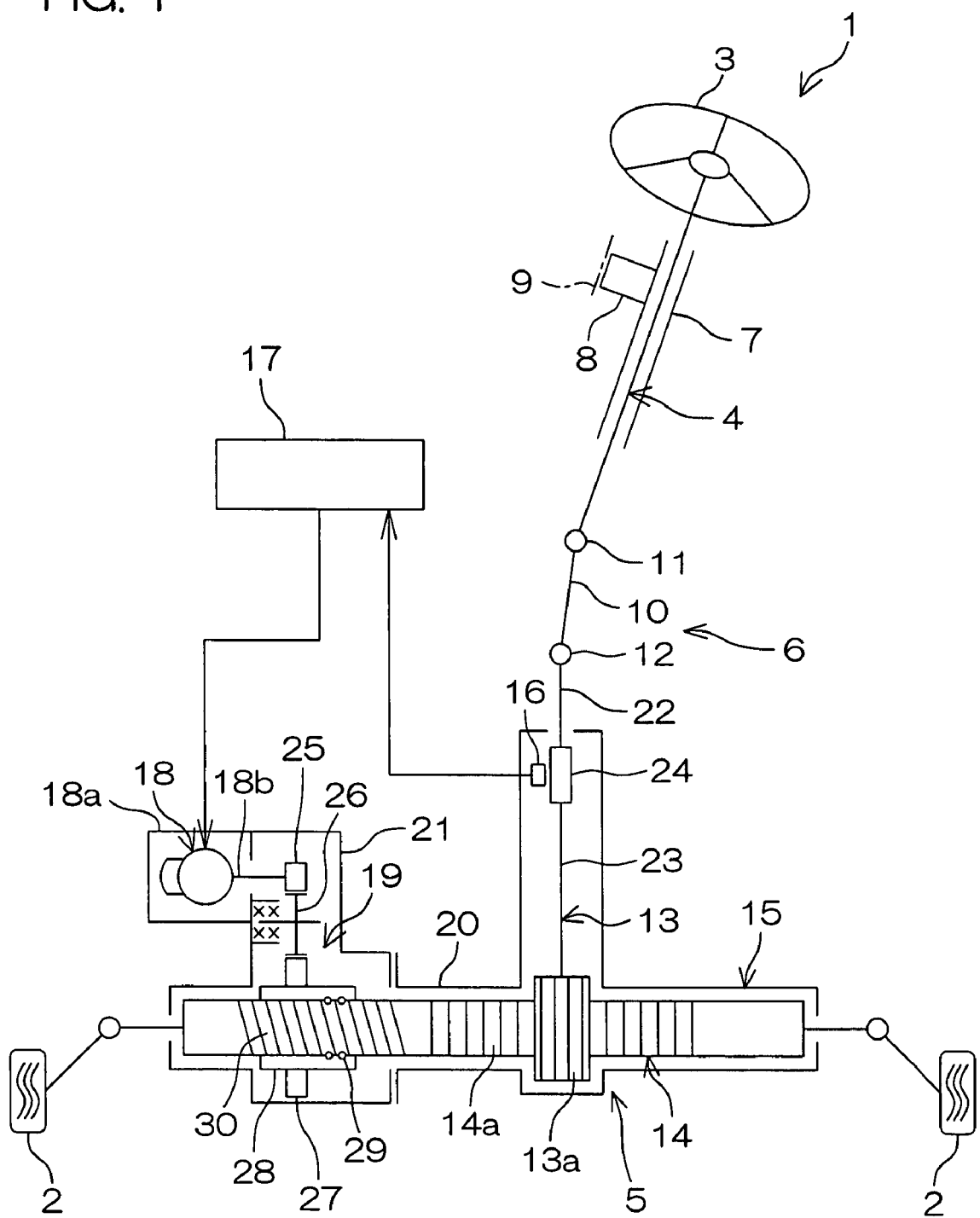
FIG. 1 is a schematic side view showing an arrangement of an electric power steering apparatus according to one embodiment of the invention.

FIG. 1 is a schematic diagram of an electric power steering apparatus according to one embodiment of the invention. Referring to FIG. 1, the electric power steering apparatus 1 includes: a steering shaft 4 for transmitting a steering torque applied to a steering wheel 3 as a steering member in order to steer steerable road wheels 2; a steering mechanism 5 comprising, for example, a rack-and-pinion mechanism for steering the steerable road wheels 2 by way of the steering torque from the steering shaft 4; and an intermediate shaft 6 interposed between the steering shaft 4 and the steering mechanism 5 and operating as a shaft coupling for transmitting rotation therebetween.

The steering shaft 4 is inserted through inside of a steering column 7 so as to be rotatably supported by the steering column 7. The steering column 7 is supported by a vehicle body 9 by means of a bracket 8. The steering wheel 3 is connected to one end of the steering shaft 4. The intermediate shaft 6 is connected to the other end of the steering shaft 4.

The intermediate shaft 6 includes: a power transmission shaft 10; a universal joint 11 provided on one end of the intermediate shaft 6; and a universal joint 12 provided on the other end thereof.

The steering mechanism 5 includes: a pinion shaft 13 as an input shaft; a rack bar 14 as a steering shaft extending transversely of a vehicle (a direction orthogonal to a direction of straight-ahead driving); and a rack housing 15 supporting the pinion shaft 13 and the rack bar 14. Pinion teeth 13a of the pinion shaft 13 and rack teeth 14a of the rack bar 14 mesh with each other.

The pinion shaft 13 is rotatably supported by the rack housing 15. The rack bar 14 is linearly-reciprocally movably supported by the rack housing 15. The rack housing 15 is fixed to the vehicle body 9. Both ends of the rack bar 14 are projected toward both sides of the rack housing 15. Each of the ends of the rack bar 14 is coupled to each corresponding steerable wheel 2 by means of a tie rod and a knuckle arm (not shown).

When the steering wheel 3 is steered, the steering torque of the steering wheel is transmitted to the steering mechanism 5 via the steering shaft 4 and the like. In the steering mechanism 5, the rotation of the pinion shaft 13 is converted into a linear movement of the rack bar 14 in a transverse direction of an automotive vehicle by means of the pinion teeth 13a and the rack teeth 14a. Accordingly, the steerable wheels 2 can be steered.

The electric power steering apparatus 1 is adapted to obtain a steering assist force according to the steering torque. Specifically, the electric power steering apparatus 1 includes: a torque sensor 16 for detecting a steering torque; an ECU 17 (Electronic Control Unit) as a controller; an electric motor 18 for steering assist; and reduction gears 19.

According to the embodiment, the electric motor 18 and reduction gears 19 are associated with the steering mechanism 5.

Figure 2:
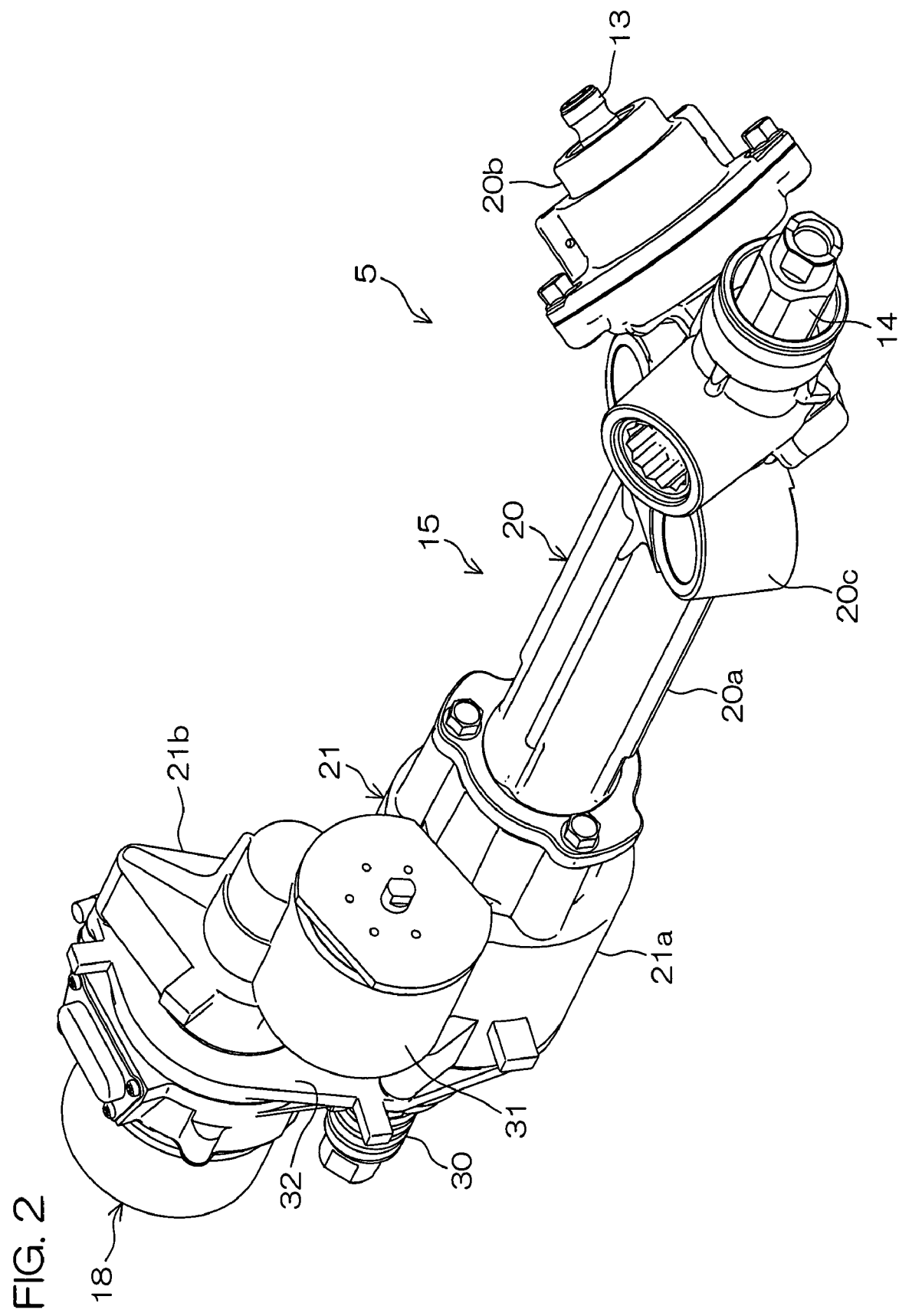
FIG. 2 is a perspective view of a steering mechanism shown in FIG. 1.
Figure 3:
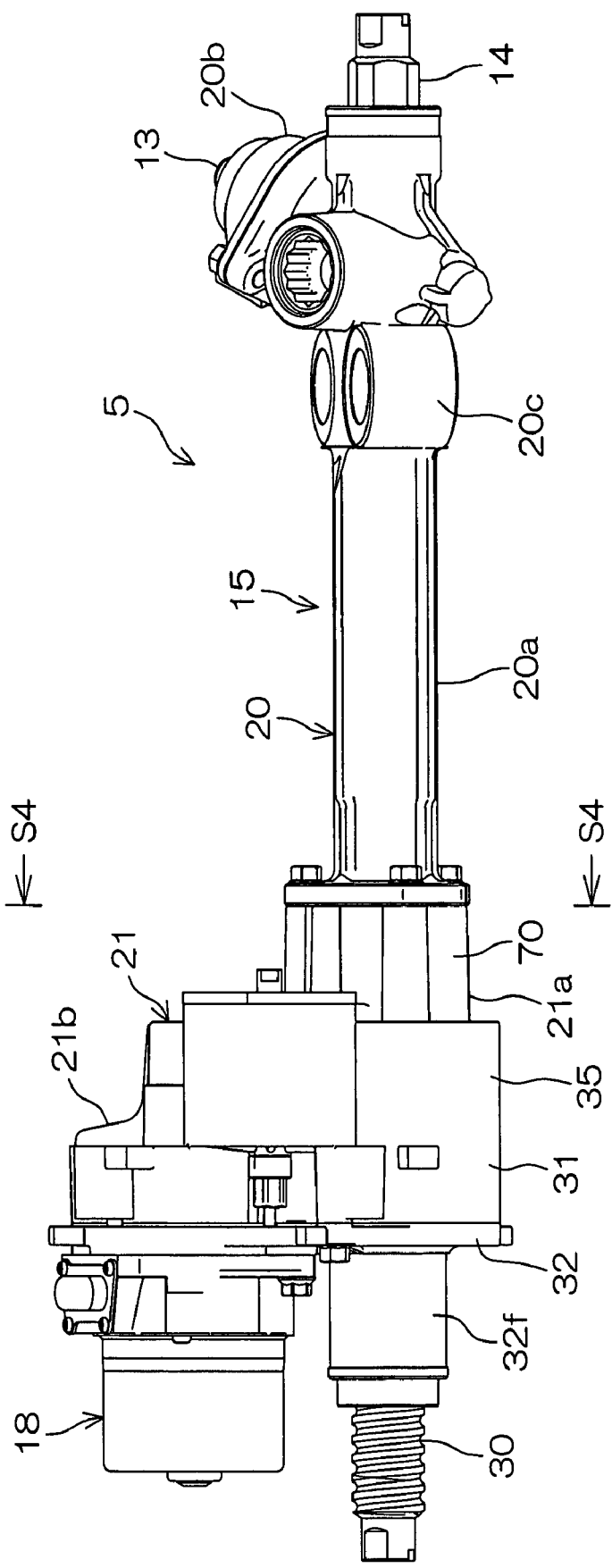
FIG. 3 is a front view of the steering mechanism of the electric power steering apparatus shown in FIG. 1.

FIG. 2 is a perspective view of the steering mechanism 5 shown in FIG. 1. FIG. 3 is a front view of the steering mechanism 5 of the electric power steering apparatus 1 shown in FIG. 1.

Referring to FIG. 2 and FIG. 3, the rack housing 15 of the steering mechanism 5 includes a first housing 20 and a second housing 21.

The first housing 20 includes: a first tubular portion 20a extending along the rack bar 14; a second tubular portion 20b supportingly accommodating the torque sensor 16 therein while supporting the pinion shaft 13; and a mounted portion 20c mounted to the vehicle body 9 so as to be supported by the vehicle body.

The second housing 21 is supported by the vehicle body 9 via the first housing 20. The second housing 21 includes: a tubular portion 21a extending along the rack bar 14; and a gear housing 21b constituting a part of the reduction gears 19 while supporting the electric motor 18. The tubular portion 21a is constituted by a third tubular portion 35 of a housing body 31 and a tubular portion 32f of an end cover 32, which will be described hereinafter. The gear housing 21b is constituted by a portion of the third tubular portion 35 of the housing body 31 excluding an extension portion 70, and a portion of the end cover 32 excluding the tubular portion 32f.

Returning to FIG. 1, the pinion shaft 13 includes an input shaft 22, an output shaft 23 and a torsion bar 24. The input shaft 22 and the output shaft 23 are coaxially coupled to each other by means of the torsion bar 24. The input shaft 22 is connected to the steering wheel 3 via the intermediate shaft 6 and the steering shaft 4. The output shaft 23 is formed with the pinion teeth 13a at an end thereof. When the steering torque is input to the input shaft 22, the torsion bar 24 undergoes elastic torsional deformation so that the input shaft 22 and the output shaft 23 are rotated relative to each other.

The torque sensor 16 is provided in association with the torsion bar 24 so as to detect a torque based on an amount of relative rotational displacement between the input shaft 22 and the output shaft 23 by means of the torsion bar 24. The detected torque is supplied to the ECU 17.

The ECU 17 controls the electric motor 18 based on the above detected torque, a detected vehicle speed supplied from a vehicle speed sensor, which is not shown, and the like.

The electric motor 18 includes: a motor housing 18a; and an output shaft 18b rotatably supported by the motor housing 18a via a bearing. The output shaft 18b of the electric motor 18 is disposed in parallel to an extension direction of the rack bar 14 so that a predetermined distance is defined between the output shaft 18b and the rack bar 14.

The reduction gears 19 include: a driving gear 25 driven by the electric motor 18; an intermediate gear 26 driven by the driving gear 25; a driven gear 27 driven by the intermediate gear 26; a nut 28 driven by the driven gear 27; and a thread shaft 30 driven by the nut 28 via a plurality of balls 29.

The driving gear 25, intermediate gear 26 and driven gear 27 individually comprise helical gears, thus constituting a helical gear mechanism.

The nut 28, balls 29 and thread shaft 30 constitute a ball screw mechanism. The ball screw mechanism functions as a converting mechanism for converting a rotary motion of the nut 28 into a linear motion of the thread shaft 30. The nut 28 includes a female thread. The nut 28 is fixed to the driven gear 27 so as to rotate in unison with the driven gear 27. For instance, the nut is formed integrally with the driven gear 27. The thread shaft 30 includes a male thread. The thread shaft 30 is fixed to the rack bar 14 so as to move in unison with the rack bar 14. In this embodiment, the male thread of the thread shaft 30 is formed on an outer periphery of the rack bar 14 and the thread shaft 30 and the rack bar 14 are formed in one piece.

An output from the electric motor 18 is transmitted to the driving gear 25, the intermediate gear 26 and the driven gear 27 in this order and is further transmitted to the rack bar 14 of the steering mechanism 5 via the ball screw mechanism.

When the steering wheel 3 is steered, the steering torque is detected by the torque sensor 16 so that the electric motor 18 generates a steering assist force according to the result of the detected torque, the detected vehicle speed and the like. The steering assist force is transmitted to the rack bar 14 via the reduction gears 19 so that the motion of the steering wheel 3 together with the steering assist force are transmitted to the rack bar 14 of the steering mechanism 5 thereby steering the steerable road wheels 2. Specifically, the output rotation of the electric motor 18 is transmitted to the rack bar 14 while being decelerated by the reduction gears 19 as a transmission device and converted into the linear motion of the rack bar 14. As a result, the steering assist is provided.

Figure 4:
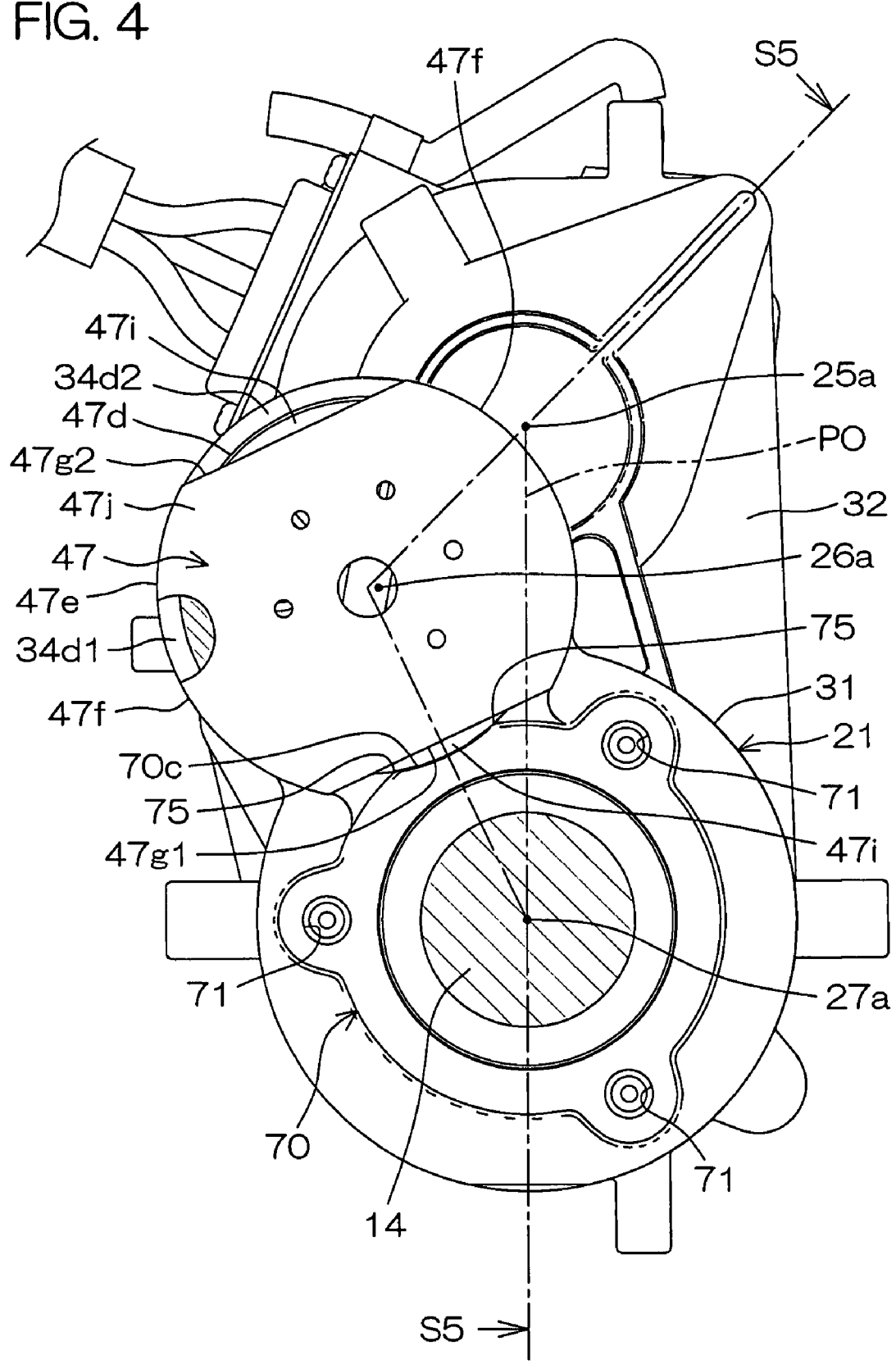
FIG. 4 is a partial right side elevation showing a principal part of the steering mechanism in section taken on the line S4-S4 in FIG. 3.
Figure 5:
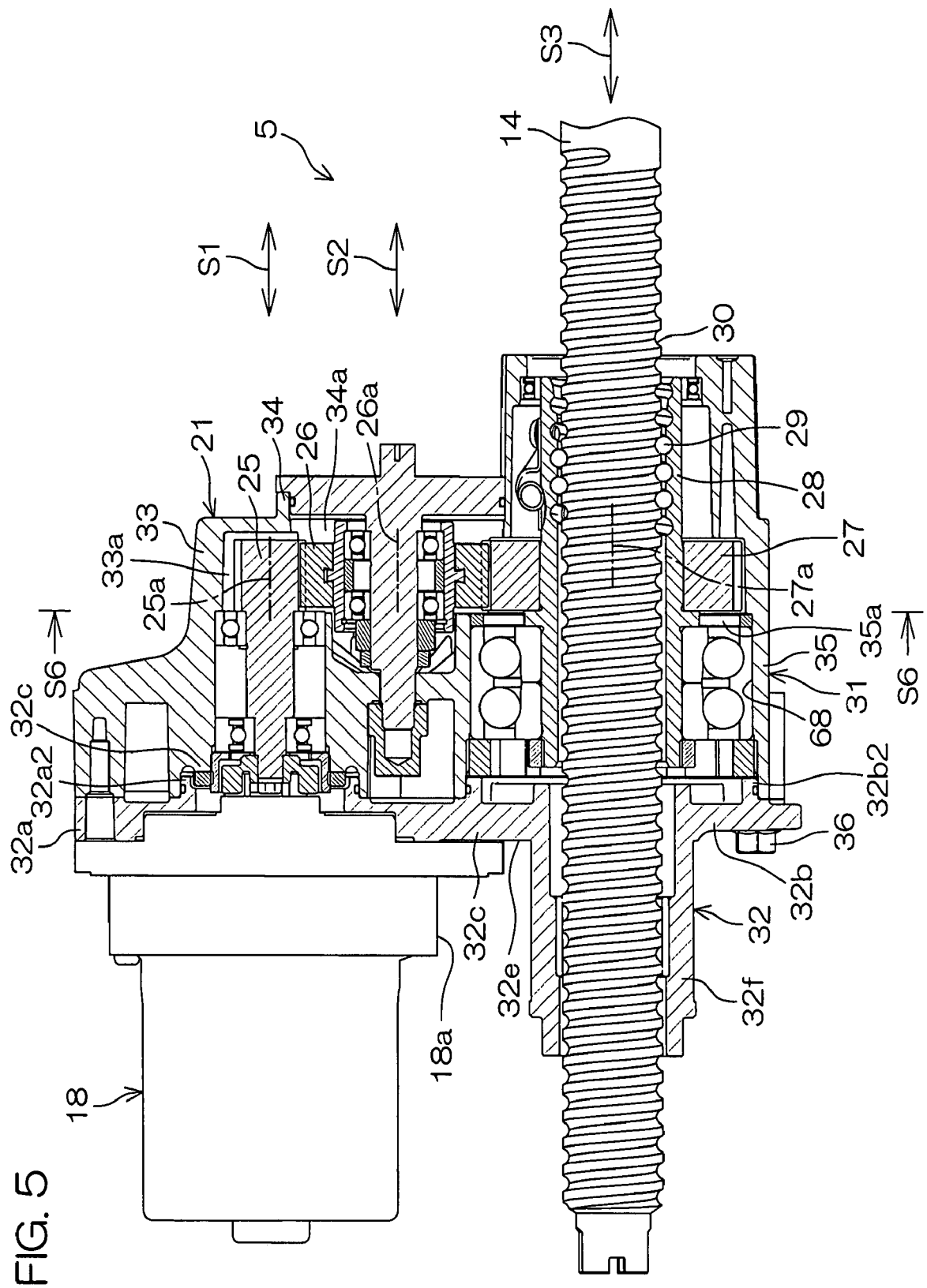
FIG. 5 is a sectional view taken on the line S5-S5 in FIG. 4.
Figure 6:
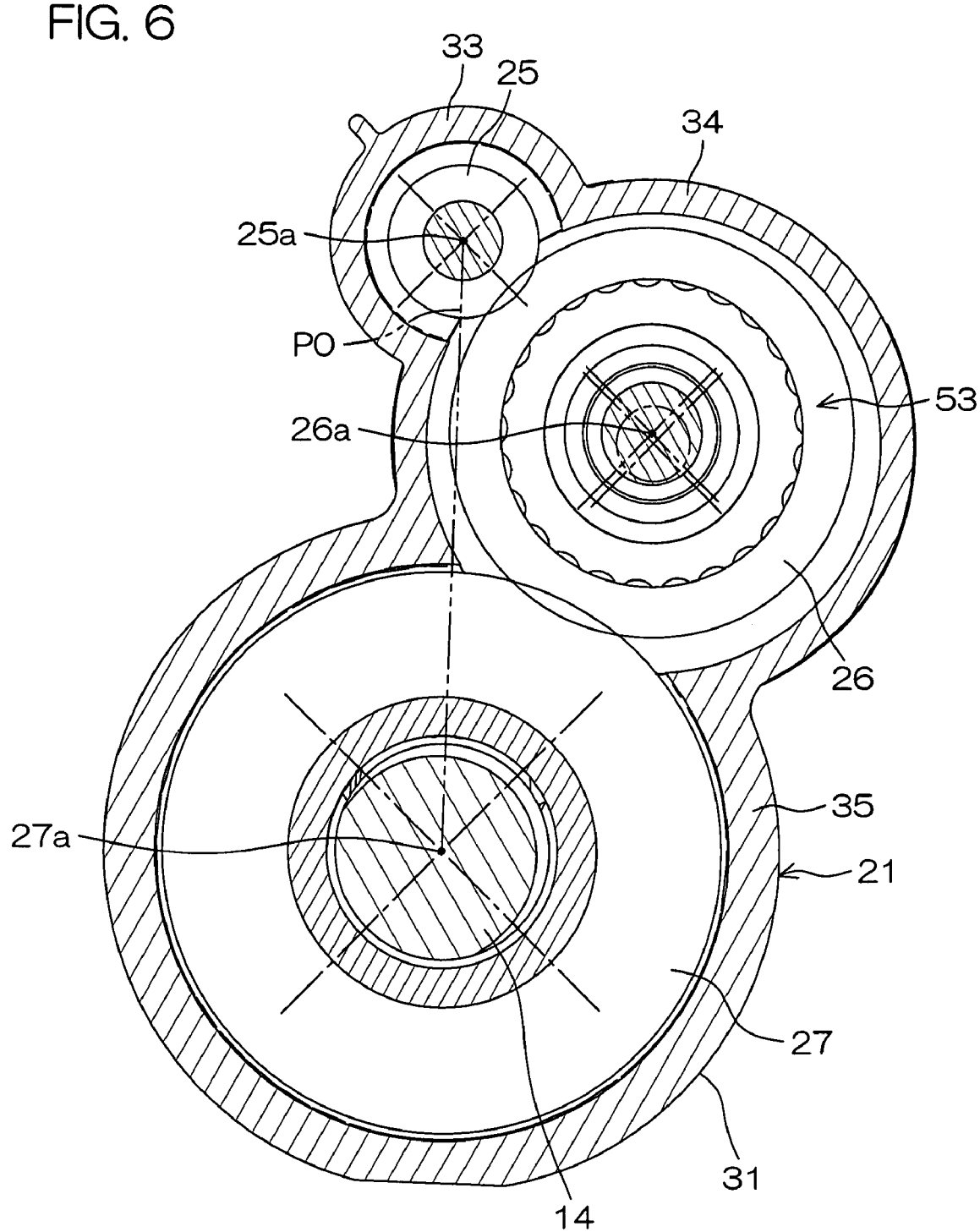
FIG. 6 is a sectional view taken on the line S6-S6 in FIG. 5.

FIG. 4 is a partial right side elevation showing a principal part of the steering mechanism 5 in section taken on the line S4-S4 in FIG. 3. FIG. 5 is a sectional view taken on the line S5-S5 in FIG. 4. FIG. 6 is a sectional view taken on the line S6-S6 in FIG. 5.

Referring to FIG. 5, a center axis 25a of the driving gear 25 and a center axis 26a of the intermediate gear 26 are disposed in parallel to each other in the embodiment. The center axis 26a of the intermediate gear 26 and a center axis 27a of the driven gear 27 are disposed in parallel to each other. The rack bar 14, the nut 28 and the tread shaft 30 are disposed in concentric relation with the driven gear 27.

Referring to FIG. 4 and FIG. 6, the center axis 26a of the intermediate gear 26 is located having a predetermined distance away from a plane P0 (indicated by two-dot-and-dash lines in the figure) including the center axis 25a of the driving gear 25 and the center axis 27a of the driven gear 27 in a direction of the normal line of the plane P0 as seen from an axial direction S2 (equivalent to an extending direction of the center axis 26a).

Referring to FIG. 3 and FIG. 5, the second housing 21 includes the housing body 31 and the end cover 32. The housing body 31 comprises a single component, and supports the driving gear 25, intermediate gear 26 and driven gear 27. The housing body 31 made of a single component requires the minimum number of components, to reduce component costs and assembly costs. The end cover 32 comprises a single component and is fixed to the housing body 31.

According to the embodiment, the driving gear 25, the intermediate gear 26 and the driven gear 27 are rotatably supported by the housing body 31 as a common housing.

Figure 7:
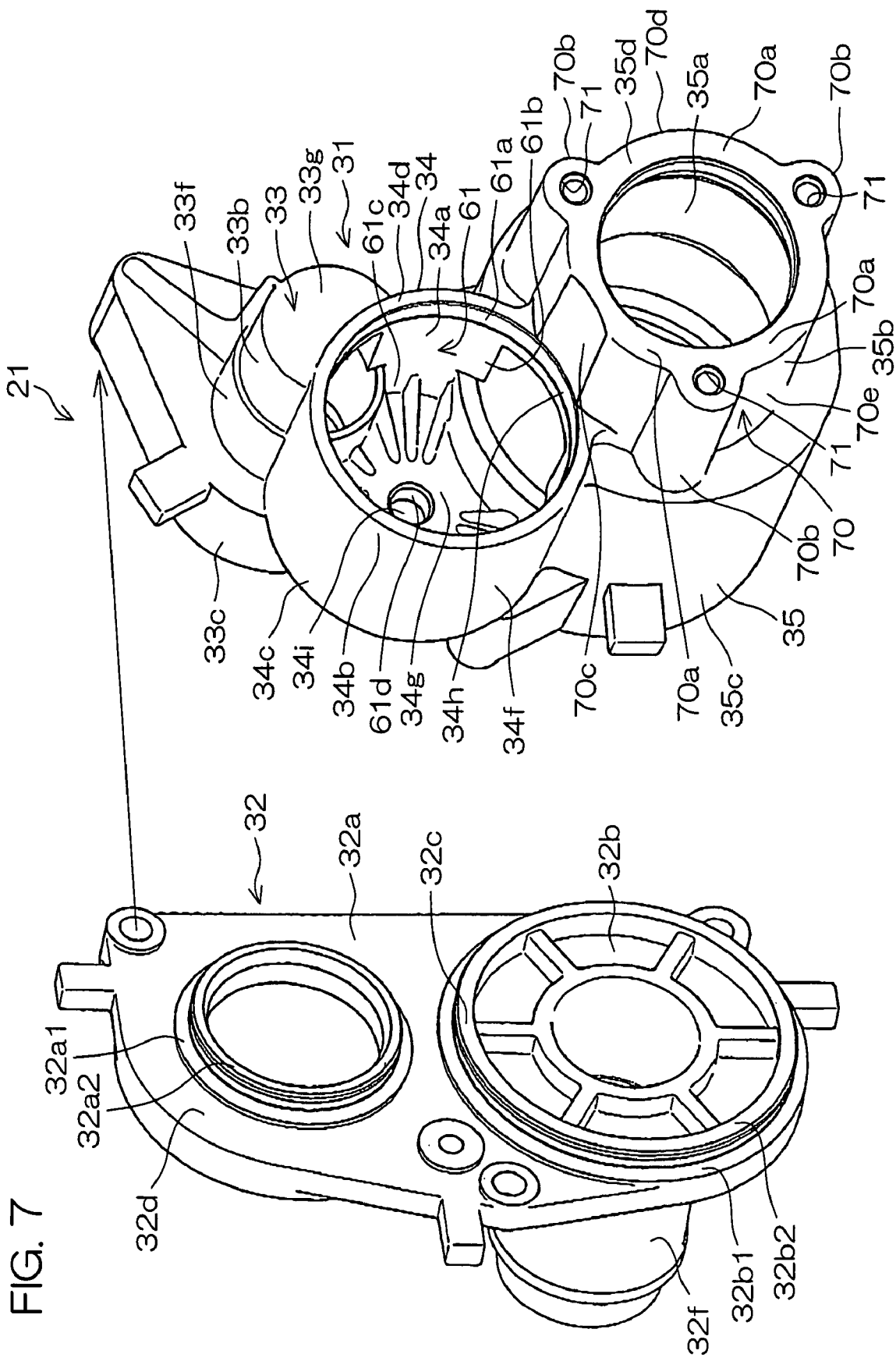
FIG. 7 is an exploded perspective view of a second housing shown in FIG. 3.
Figure 8:
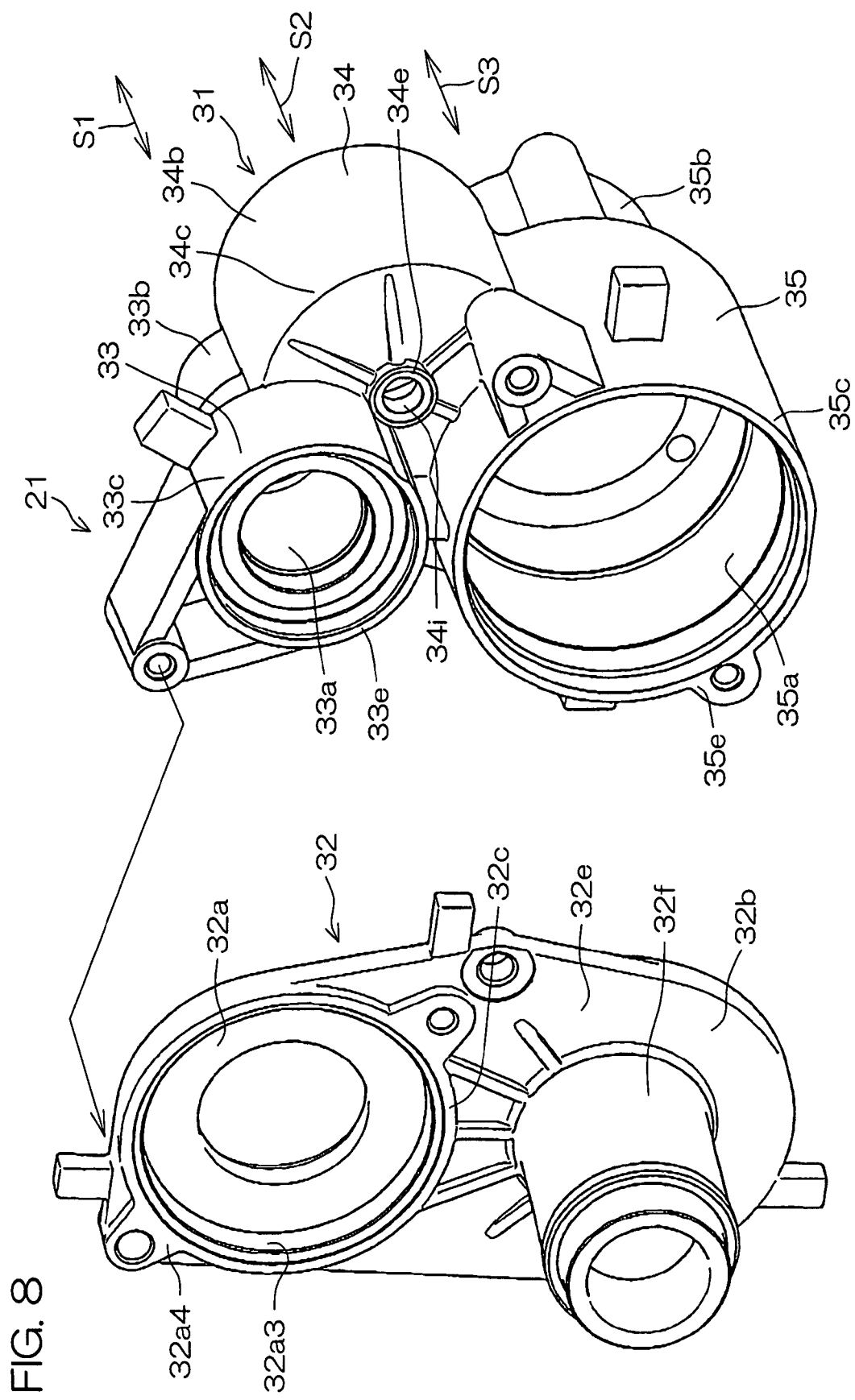
FIG. 8 is an exploded perspective view of the second housing of FIG. 3 as viewed from a different viewpoint from that of FIG. 7.

FIG. 7 is an exploded perspective view of the second housing 21 shown in FIG. 3. FIG. 8 is an exploded perspective view of the second housing 21 of FIG. 3 as viewed in a different direction from that of FIG. 7. FIG. 9A, FIG. 9B and FIG. 9C are views showing a left side elevation, a front elevation and a right side elevation, respectively, of the housing body 31 of the second housing 21 shown in FIG. 3.

Referring to FIG. 7 and FIG. 8, the housing body 31 includes a first tubular portion 33, a second tubular portion 34 and the third tubular portion 35. The first tubular portion 33, the second tubular portion 34 and the third tubular portion 35 are connected to each other and are integrally formed from a metal such as an aluminum alloy.

Referring to FIG. 5 and FIG. 8, the first tubular portion 33 is shaped like a closed-end tube. The first tubular portion 33 supports the driving gear 25. The first tubular portion 33 defines a first housing space 33a for accommodating the driving gear 25 therein.

Referring to FIG. 7 and FIG. 8, the first tubular portion 33 includes a first end 33b and a second end 33c disposed on opposite sides with respect to an axial direction S1. The first end 33b is closed. The first housing space 33a is opened only at the second end 33c as one end of the first tubular portion 33 only toward one side in the axial direction S1 (equivalent to the left side as seen in FIG. 5). The second end 33c includes an end face 33e intersecting the axial direction S1 at right angles.

The axial direction S1 of the first tubular portion 33 is equivalent to an extending direction of a center axis of the first tubular portion 33 and coincides with an axial direction of the first housing space 33a, an axial direction of the driving gear 25 and an axial direction of a driving-gear support shaft 38 to be described hereinafter.

Referring to FIG. 5 and FIG. 7, the second tubular portion 34 is shaped like a closed-end tube. The second tubular portion 34 supports the intermediate gear 26. The second tubular portion 34 defines a second housing space 34a for accommodating the intermediate gear 26 therein.

Referring to FIG. 7 and FIG. 8, the second tubular portion 34 includes a first end 34b and a second end 34c disposed on opposite sides with respect to the axial direction S2.

The axial direction S2 of the second tubular portion 34 is equivalent to an extending direction of a center axis of the second tubular portion 34, and coincides with an axial direction of the second housing space 34a and an axial direction of an intermediate-gear support shaft 46 to be described hereinafter, and is in parallel to an axial direction of the intermediate gear 26 and the axial direction S1 of the first tubular portion 33.

The first end 34b defines an entry aperture 34h as a first circle hole. The entry aperture 34h as the first circle hole defines a circle having an inside diameter larger than an outside diameter of the intermediate gear 26 by a predetermined length. The entry aperture serves as an aperture through which the intermediate gear 26 is assembled in the second housing space 34a during assembly. The first end 34b includes an end face 34d as a marginal portion of the entry aperture 34h. The end face 34d intersects the axial direction S2 at right angles.

The second end 34c comprises a bottom wall centrally formed with a support hole 34i as a second circle hole. The support hole 34i as the second circle hole is provided for the purpose of supporting the intermediate gear 26. The second end 34c includes an end face 34e as a marginal portion of the support hole 34i. The end face 34e intersects the axial direction S2 at right angles.

The entry aperture 34h as the first circle hole has a relatively larger diameter, whereas the support hole 34i as the second circle hole has a relatively smaller diameter. A center axis 301 of the entry aperture 34h as the first circle hole and a center axis 302 of support hole 34i as the second circle hole are arranged on the same axial line.

The second housing space 34a is opened only at the first end 34b as one end thereof only toward the other side with respect to the axial direction S2 (equivalent to the right side as seen in FIG. 5).

Referring to FIG. 5 and FIG. 8, the third tubular portion 35 is shaped like a tube. The third tubular portion 35 rotatably supports the driven gear 27 and allows the rack bar 14 to be inserted therethrough. The third tubular portion 35 defines a third housing space 35a for accommodating the driven gear 27.

Referring to FIG. 7 and FIG. 8, the third tubular portion 35 includes a first end 35b and a second end 35c disposed on opposite sides with respect to an axial direction S3. The first end 35b and the second end 35c are both open. An inner periphery surface of the second end 35c has a larger diameter than that of an inner periphery surface of the first end 35b. It can be said that the third housing space 35a is opened at the second end 35c as one end thereof with respect to the axial direction S3 of the third tubular portion 35 and toward the one side with respect to the axial direction S3.

The axial direction S3 of the third tubular portion 35 is equivalent to an extending direction of an axis of the third tubular portion 35. The axial direction S3 coincides with the axial direction of the third housing space 35a, an axial direction of the driven gear 27, an axial direction of the rack bar 14 and an axial direction of a driven-gear support shaft 62 to be described hereinafter, and is in parallel to the axial directions S1, S2.

The first end 35b of the third tubular portion 35 includes an end face 35d intersecting the axial direction S3 at right angles. The second end 35c of the third tubular portion 35 includes an end face 35e intersecting the axial direction S3 at right angles. This end face 35e and the end face 33e of the second end 33c of the first tubular portion 33 are located at the same position with respect to the axial direction S3.

Referring to FIG. 9A, FIG. 9B and FIG. 9C, the second housing space 34a is opened in the opposite direction to the direction in which the first housing space 33a and the third housing space 35a adjoining the second housing space 34a are opened. As viewed in the axial direction S2, the second housing space 34a partially overlaps with the first housing space 33a as a remaining housing space, and also partially overlaps with the third housing space 35a as a remaining housing space.

Specifically, a region 33a1 constituting a part of the first housing space 33a and defining a circumferential portion in the vicinity of the second end 33c of the first tubular portion 33 is overlapped with a region 34a1 constituting a part of the second housing space 34a and defining a circumferential portion in the vicinity of the first end 34b of the second tubular portion 34, as viewed in the axial directions S1, S2. On the other hand, a region 35a2 constituting a part of the third housing space 35a and defining a circumferential portion in the vicinity of the second end 35c of the third tubular portion 35 is overlapped with a region 34a2 constituting a part of the second housing space 34a and defining a circumferential portion in the vicinity of the first end 34b of the second tubular portion 34, as viewed in the axial directions S2, S3.

The above regions 33a1, 34a1, 34a2, 35a2 include respective portions for supporting the individually corresponding gears 25, 26, 27, as will be described hereinafter. This permits the tubular portions 33, 34, 35 having the larger diameters to bear the corresponding gears 25, 26, 27 stably, so that the gears 25, 26, 27 are less liable to incline relative to each other. Furthermore, the housing body 31 may be reduced in size.

Referring to FIG. 5 and FIG. 8, the end cover 32 is mounted to an end of the housing body 31 with respect to the axial direction S1 and is fixed thereto by means of plural bolts 36 as a fixing member. The end cover 32 includes a first portion 32a and a second portion 32b. These first and second portions 32a, 32b are integrally formed and adjoin each other in a direction orthogonal to the axial direction S1.

The first portion 32a of the end cover 32 is disposed at the second end 33c as the open end of the first tubular portion 33. The first portion 32a of the end cover 32 positions the electric motor 18 and is positioned by the housing body 31. The electric motor 18 is positioned to the housing body 31 by means of the end cover 32. The electric motor 18 is fixed to the housing body 31 by means of a bolt 37 (see FIG. 11) as a fixing member. The electric motor 18 and the housing body 31 clamp the end cover 32 therebetween.

The second portion 32b of the end cover 32 is disposed at the second end 35c as the open end of the third tubular portion 35, thus covering the second end 35c.

The end cover 32 further includes a connecting portion 32c for the first portion 32a and the second portion 32b. The connecting portion 32c covers the second end 35c of the third tubular portion 35 while supporting the electric motor 18.

Figure 10C:
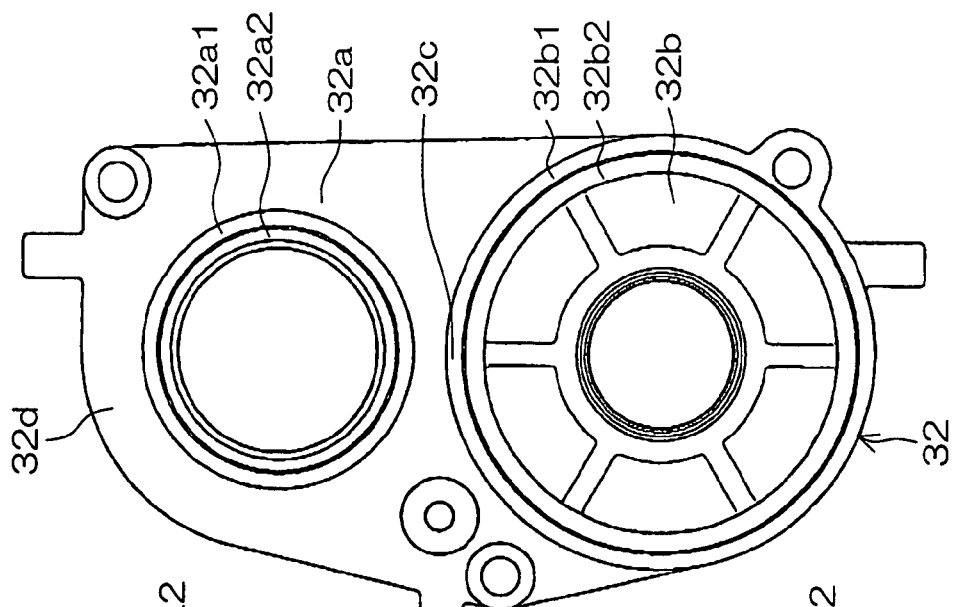
FIG. 10A, FIG. 10B and FIG. 10C are views showing a left side elevation, a front elevation and a right side elevation, respectively, of an end cover of the second housing shown in FIG. 3.
Figure 10B:
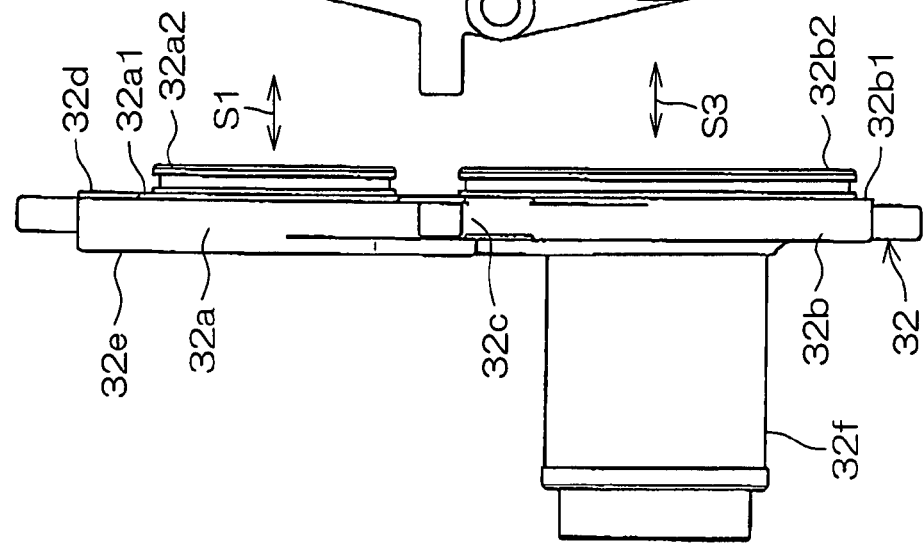
Figure 10A:
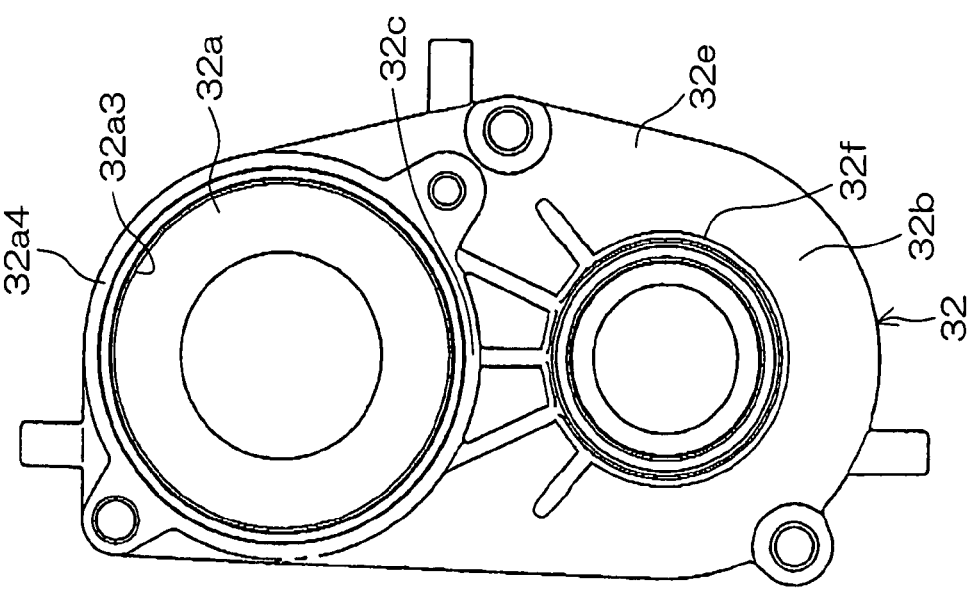
Figure 11:
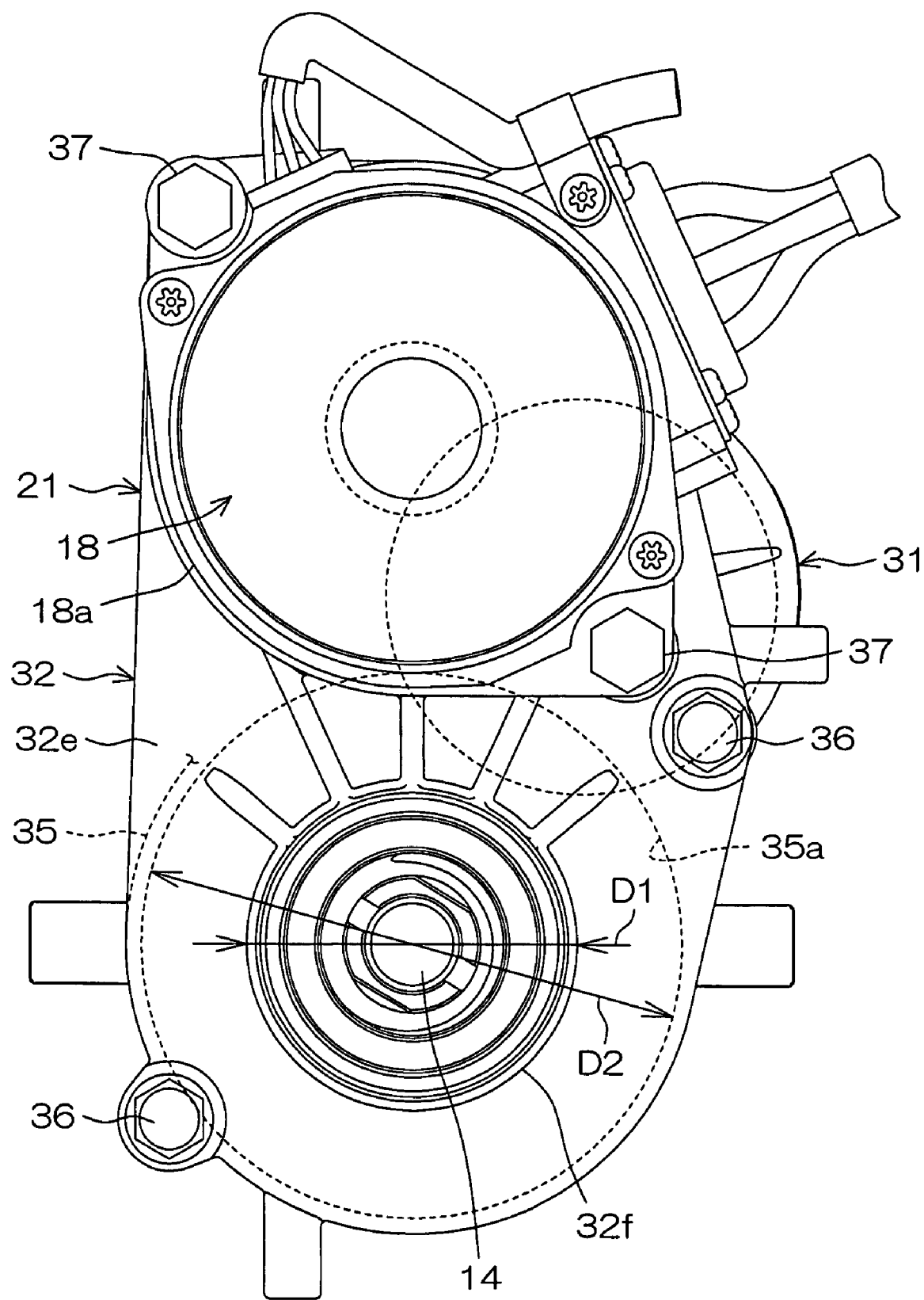
FIG. 11 is a left side elevation of the steering mechanism shown in FIG. 3.

FIG. 10A, FIG. 10B and FIG. 10C are views showing a left side elevation, a front elevation and a right side elevation, respectively, of the end cover 32 of the second housing 21 shown in FIG. 3. FIG. 11 is a left side elevation of the steering mechanism 5 shown in FIG. 3.

Referring to FIG. 10A, FIG. 10B and FIG. 10C, the end cover 32 includes: an inside surface 32d opposing the housing body 31; and an outside surface 32e on the opposite side from the inside surface 32d.

The inside surface 32d of the end cover 32 includes: a portion corresponding to the first portion 32a; and a portion corresponding to the second portion 32b. The outside surface 32e of the end cover 32 includes: a portion corresponding to the first portion 32a; and a portion corresponding to the second portion 32b.

In the inside surface 32d of the end cover 32, the portion corresponding to the first portion 32a includes: an annular end face 32a1 in contact with the end face 33e of the second end 33c of the first tubular portion 33 of the housing body 31; and an annular projection 32a2 fitted in an inner periphery of the second end 33c of the first tubular portion 33. The annular projection 32a2 is projected from the annular end face 32a1 in the axial direction S1. An outer periphery of the annular projection 32a2 is shaped like a cylindrical surface.

In the outside surface 32e of the end cover 32, as shown in FIG. 8 and FIG. 11, the portion corresponding to the first portion 32a1 includes: a tubular inner periphery 32a3; and an annular end face 32a4 surrounding the inner periphery 32a3. The inner periphery 32a3 is disposed concentrically with the outer periphery of the annular projection 32a2 of the inside surface 32d, and is fitted with a fitting portion of an end of the motor housing 18a of the electric motor 18. The end face 32a4 of the outside surface 32e is formed in parallel to the end face 32a1 of the inside surface 32d and is abutted against an end face of the end of the motor housing 18a of the electric motor 18.

The fitting portion and the end face at the end of the motor housing 18a of the electric motor 18 constitute a coupling portion for coupling to the housing body 31.

The aforesaid inner periphery 32a3 and end face 32e4 of the end cover 32 function as a coupling portion for coupling to the coupling portion of the motor housing 18a of the electric motor 18 and are capable of positioning the electric motor 18.

In the inside surface 32d of the end cover 32 as shown in FIG. 9B and FIG. 10B, the portion corresponding to the second portion 32b includes an annular end face 32b1 and an annular projection 32b2. The annular projection 32b2 is projected from an inner circumferential edge of the annular end face 32b1 in the axial direction S3. An outer periphery of the annular projection 32b2 is shaped like a cylindrical surface, so as to be fitted in the inner periphery of the second end 35c of the third tubular portion 35 of the housing body 31. The annular end face 32b1 is in contact with the end face 35e of the second end 35c of the third tubular portion 35 of the housing 31. Thus, the end cover 32 is positioned by the housing body 31.

In the outside surface 32e of the end cover 32 as shown in FIG. 5 and FIG. 10B, the portion corresponding to the second portion 32b includes the tubular portion 32f projected in the axial direction S3. The thread shaft 30 of the rack bar 14 is inserted through the tubular portion 32f in a manner to be movable in the axial direction S3. The tubular portion 32f is disposed in concentric relation with the outer periphery of the annular projection 32b2 of the inside surface 32d and with an inner periphery 68 of the third tubular portion 35 of the housing body 31.

Referring to FIG. 11, the maximum outside diameter D1 of the tubular portion 32f is smaller than the maximum inside diameter (equivalent to the maximum outside diameter D2 of the third housing space 35a) of the third tubular portion 35. As viewed in the axial direction S3, the third housing space 35a of the third tubular portion 35 and the motor housing 18a are partially overlapped each other.

Figure 12:
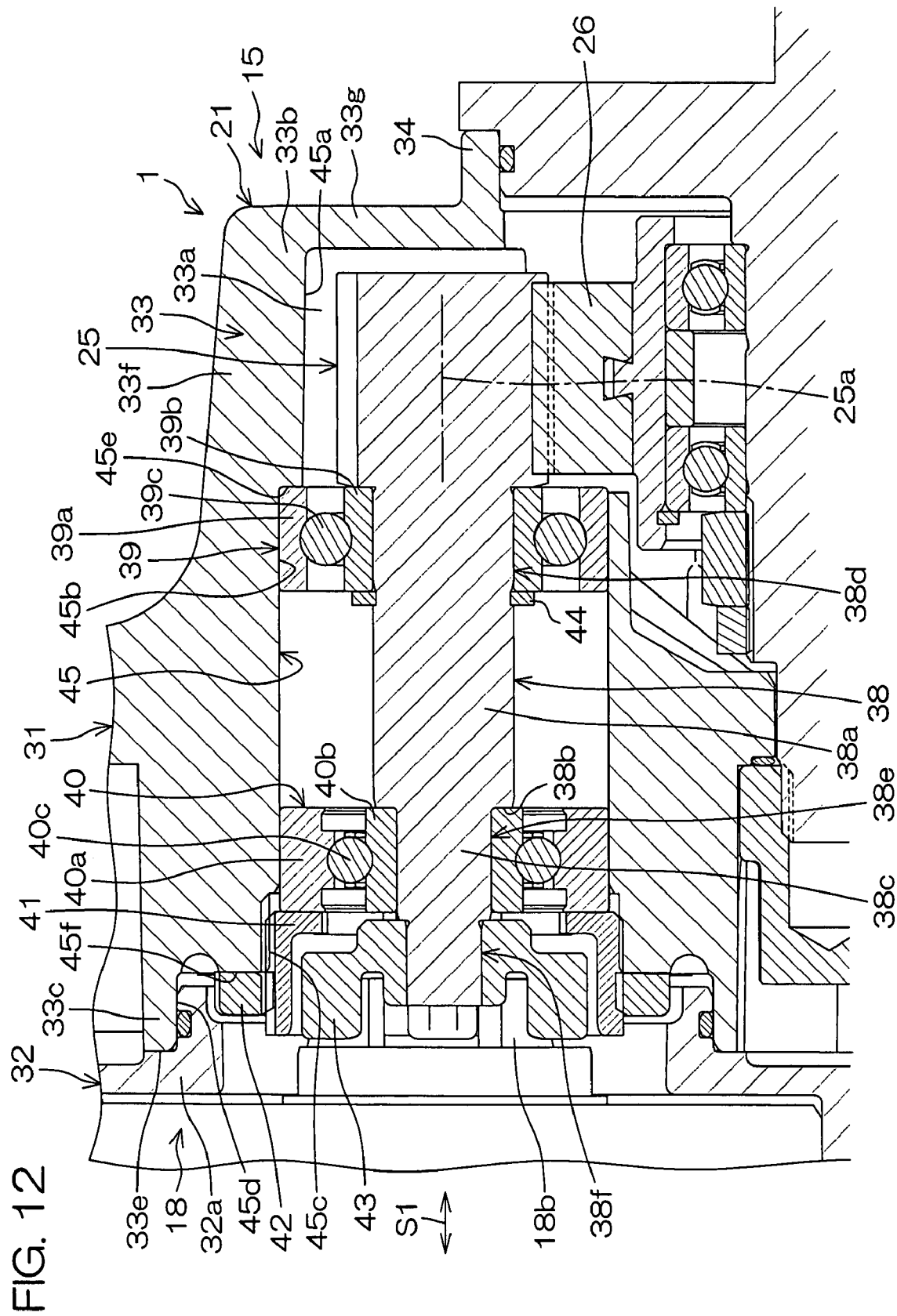
FIG. 12 is an enlarged view of the principal part of FIG. 5, mainly showing a driving gear.

FIG. 12 is an enlarged view of a principal part of FIG. 5, mainly showing the driving gear 25.

Referring to FIG. 12, the electric power steering apparatus 1 includes: the driving-gear support shaft 38 as a first support shaft for supporting the driving gear 25; plural bearings 39, 40 for rotatably supporting the driving gear 25; a fixing member 41 and a lock nut 42 for restricting the axial movement of the bearings 39, 40; and a shaft coupling 43 for coupling the driving-gear support shaft 38 to the output shaft 18b of the electric motor 18.

The driving gear 25 is rotatably supported by the first tubular portion 33 of the housing body 31 by means of the driving-gear support shaft 38 and the two bearings 39, 40. The first tubular portion 33 retains the two bearings 39, 40, which rotatably support the driving-gear support shaft 38.

The bearing 39 includes an outer ring 39a, an inner ring 39b and a plurality of balls 39c as a rolling element rollably interposed between the inner ring 39b and the outer ring 39a. The bearing 40 includes an outer ring 40a, an inner ring 40b and a plurality of balls 40c as a rolling element rollably interposed between the inner ring 40b and the outer ring 40a. Each of the bearings 39, 40 comprises a deep groove ball bearing.

The driving gear 25 comprises a helical gear formed of a metal in a substantially column-like configuration and with a plurality of helical teeth on an outer periphery thereof.

The driving gear 25 is concentrically fixed to one end of the driving-gear support shaft 38 with respect to the axial direction S1 so as to capable of rotating together with the shaft. In this embodiment, the driving gear 25 and the driving-gear support shaft 38 are formed in one piece. Alternatively, the driving gear 25 and the driving-gear support shaft 38 may be independently formed and fixed to each other.

The driving gear 25 is supported in a cantilever fashion. The plural bearings 39, 40 are disposed to the driving-gear support shaft 38 on the same side of the axial direction S1 of the shaft 38 with respect to the driving gear 25. A one bearing 39 adjoins the driving gear 25, whereas the other bearing 40 is spaced away from the driving gear 25 in the axial direction S1. The one bearing 39 and the other bearing 40 are so disposed as to define a predetermined distance between opposing end faces thereof.

The driving-gear support shaft 38 is shaped like a stepped column extending in the axial direction S1. The driving-gear support shaft 38 includes: a larger diameter portion 38a; and a smaller diameter portion 38c connected to the larger diameter portion 38a via an end wall 38b. The larger diameter portion 38a is disposed to adjoin the driving gear 25 and formed in a cylindrical surface. The smaller diameter portion 38c is formed in a cylindrical surface and is disposed on the opposite side from the driving gear 25 interposing the larger diameter portion 38a therebetween.

The driving-gear support shaft 38 includes: a first retaining portion 38d for retaining the inner ring 39b of the one bearing 39; a second retaining portion 38e for retaining the inner ring 40b of the other bearing 40; and a connecting portion 38f coupled to the shaft coupling 43 to rotate together.

The connecting portion 38f is disposed at an end of the driving-gear support shaft 38 and the opposite side from the driving gear 25 with respect to the axial direction S1.

The first retaining portion 38d restricts the axial movement of the inner ring 39b of the one bearing 39. The first retaining portion 38d includes: a fit-engagement portion fitted in an inner periphery of the inner ring 39b; a first restricting portion receiving the one end face of the inner ring 39b thereby preventing the inner ring 39b from moving in one direction of the axial direction S1; and a second restricting portion receiving the other end face of the inner ring 39b thereby preventing the inner ring 39b from moving in the other direction of the axial direction S1. The fit-engagement portion of the first retaining portion 38d comprises an outer periphery of the larger diameter portion 38a adjoining the driving gear 25. The first restricting portion of the first retaining portion 38d comprises a lateral side of the driving gear 25. The second restricting portion of the first retaining portion 38d comprises a snap ring 44 fitted in a circumferential groove formed in the outer periphery of the larger diameter portion 38a.

The second retaining portion 38e restricts the axial movement of the other ring 40b of the other bearing 40. The second retaining portion 38e includes: a fit-engagement portion fitted in an inner periphery of the inner ring 40b; and a restricting portion receiving a one end face of the inner ring 40b for preventing the inner ring 40b from moving in one direction of the axial direction S1. The fit-engagement portion of the second retaining portion 38e comprises an outer periphery of the smaller diameter portion 38c. The restricting portion of the second retaining portion 38e comprises the end wall 38b.

The driving-gear support shaft 38 is prevented from moving in both sides of the axial direction S1 by the first tubular portion 33 of the housing body 31 by means of the fixing member 41 and the pair of bearings 39, 40.

Referring to FIG. 12 and FIG. 7, the first tubular portion 33 includes: a main body 33f as a tubular portion defining an inner periphery 45; and a bottom 33g disposed at the first end 33b of the first tubular portion 33 with respect to the axial direction S1.

The first housing space 33a is defined as enclosed by the inner periphery 45 and bottom 33g of the first tubular portion 33. The first housing space 33a is opened to one side with respect to the axial direction S1, specifically, opened to the opposite side from the bottom 33g. The first housing space 33a is adapted to incorporate the driving gear 25 as a housed item from the aforesaid one side with respect to the axial direction S1.

The inner periphery 45 includes: a first portion 45a surrounding the driving gear 25; a second portion 45b retaining the paired bearings 39, 40; a third portion 45c retaining the fixing member 41; and a fourth portion 45d fitted with the end cover 32. The first portion 45a, the second portion 45b, the third portion 45c and the fourth portion 45d are adjacently arranged in this order from the bottom 33g along the axial direction S1, and are increased in diameter in this order.

On the inner periphery 45, the first portion 45a has arcuate sections as viewed in the axial direction S1. An aperture is formed between the arcuate ends of the sectional portions. Via the aperture, an interior of the first tubular portion 33 is communicated with an interior of the second tubular portion 34. The second portion 45b is connected to the first portion 45a via an end wall 45e. The second portion 45b comprises a circumferentially continuous cylindrical surface. The third portion 45c includes a female thread, into which the fixing member 41 is threaded. The fourth portion 45d is connected to the third portion 45c via an end wall 45f and comprises a circumferentially continuous cylindrical surface.

The fixing member 41 is engaged with the inner periphery 45 of the first tubular portion 33 in a position-adjustable manner with respect to the axial direction S1. The fixing member 41 has an annular shape and is formed with a male thread on an outer periphery thereof. The fixing member 41 is threaded into the female thread of the third portion 45c of the inner periphery 45 located at an entry aperture of the first tubular portion 33. The outer ring 40a of the bearing 40 may be pressingly biased with a predetermined pressing force by adjusting a threaded amount of the fixing member 41. The lock nut 42 as an anti-rotation member is threaded into the male thread of the fixing member 41. An end face of the lock nut 42 is abutted against the end wall 45f at the entry aperture of the first tubular portion 33. The lock nut 42 inhibits the fixing member 41 from moving in the axial direction S1.

The fixing member 41 functions as a preloading member for applying a preload to the paired bearings 39, 40 in the axial direction S1 in the following manner. As a result, the two bearings 39, 40 are removed of bearing clearance (play) so that the driving gear 25 is less prone to inclination in meshing engagement.

Specifically, the inner rings 39b, 40b of the two bearings 39, 40 are restricted from relatively moving toward each other in the axial direction S1 and are juxtaposed to each other as defining a predetermined distance between the mutually opposing end faces thereof with respect to the axial direction S1. In the meantime, the outer rings 39a, 40a of the two bearings 39, 40 have their end faces at sides, farther away from each other. The end faces are received in the axial direction S1, and abutted against the end wall 45e of the first tubular portion 33 and the end face of the fixing member 41, respectively. The outer rings 39a, 40a are allowed to move toward each other.

In this state, the fixing member 41 is threaded into the first tubular portion 33 and adjusted in the axial direction S1, thereby bringing the outer rings 39a, 40a closer to each other for adjusting a distance therebetween to a predetermined length. The distance between the outer rings 39a, 40a with respect to the axial direction S1, for example, is shorter than that between the inner rings 39b, 40b.

In this manner, a pressing force as a predetermined preload in the axial direction S1 may be applied to the bearings 39, 40. The inner ring 39b and the outer ring 39a of the bearing 39 are biased reversely each other to the axial direction S1. In the meantime, the inner ring 40b and the outer ring 40a of the bearing 40 are biased reversely each other to the axial direction S1. As a result, both the bearings 39, 40 are removed of the bearing clearance.

Figure 13:
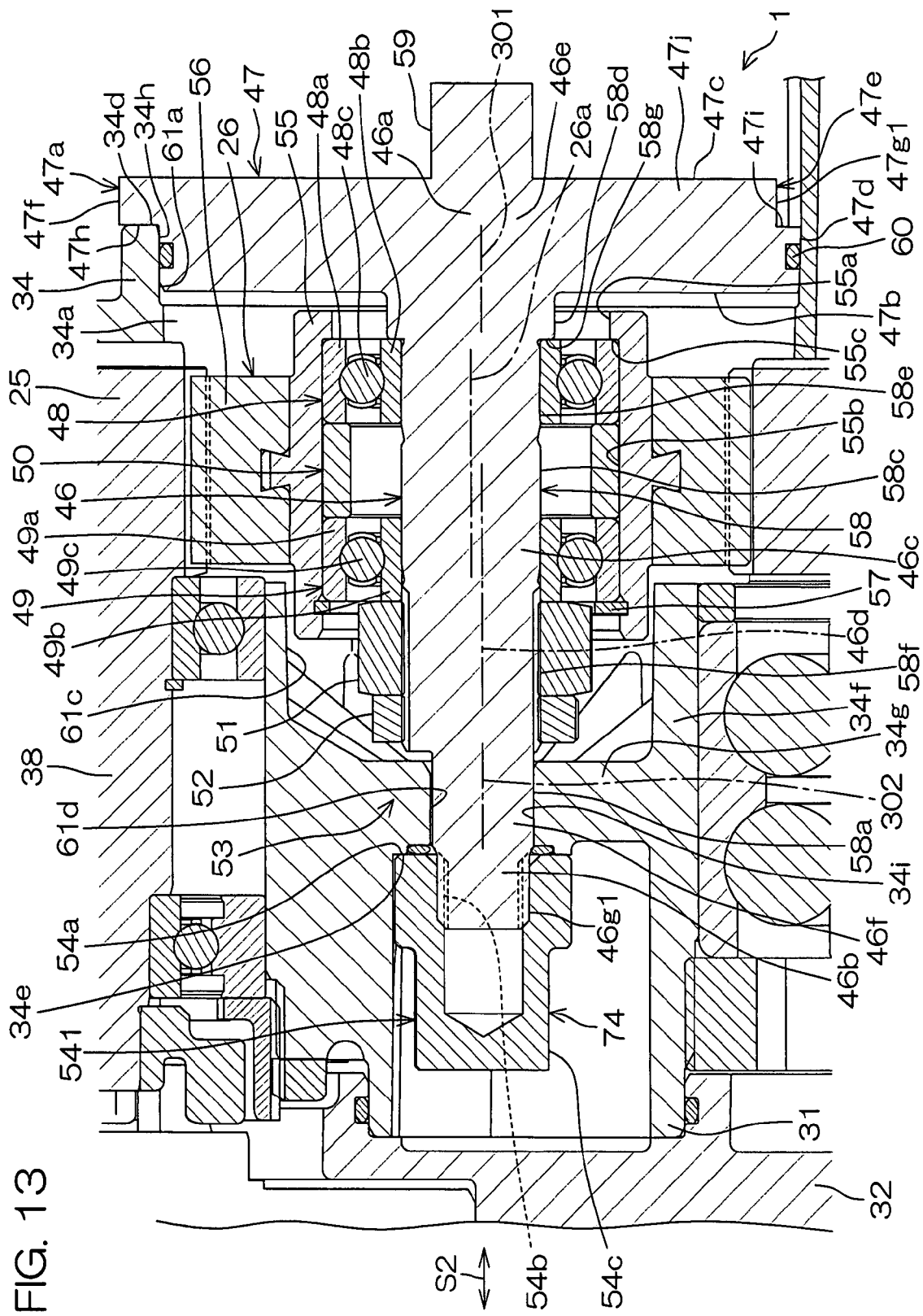
FIG. 13 is an enlarged view of the principal part of FIG. 5, mainly showing an intermediate gear.

FIG. 13 is an enlarged view of the principal part of FIG. 5, mainly showing the intermediate gear 26.

Referring to FIG. 13, the electric power steering apparatus 1 includes: the intermediate-gear support shaft 46 as a second support shaft for supporting the intermediate gear 26; an end plate 47 disposed at the intermediate-gear support shaft 46; plural bearings 48, 49 supported by the intermediate-gear support shaft 46 and rotatably supporting the intermediate gear 26; a spacer 50 for spacing the bearings 48, 49 from each other; and a fixing member 51 and a lock nut 52 for restricting the axial movement of the bearings 48, 49.

The electric power steering apparatus 1 further includes an eccentric mechanism 53 for adjustably positioning the intermediate gear 26 to the housing body 31. The eccentric mechanism 53 is capable of adjusting the position of the center axis 26a of the intermediate gear 26 by rotating the intermediate-gear support shaft 46. This allows the adjustment of backlash amount related to the intermediate gear 26.

The electric power steering apparatus 1 further includes a fastening member 541 serving as a rotation restricting member for restricting the rotation of the intermediate-gear support shaft 46 thus adjusted in the rotational position thereof and also as a pressing member. This fastening member 541 constitutes a fastening mechanism 74 for fastening the intermediate-gear support shaft 46 adjusted in position, as will be described hereinafter.

The intermediate-gear support shaft 46 comprises a bar-like member extending in one direction. The intermediate-gear support shaft 46 includes: a first end 46a as one end with respect to a longitudinal direction thereof (equivalent to the axial direction S2); a second end 46b as the other end with respect to the longitudinal direction thereof; and an intermediate portion 46c with respect to the longitudinal direction thereof. The intermediate portion 46c of the intermediate-gear support shaft 46 supports the bearings 48, 49. The end plate 47 is provided at the first end 46a of the intermediate-gear support shaft 46. The intermediate-gear support shaft 46 and the end plate 47 are integrated rotatable together, thus constituting a shaft unit.

In the shaft unit of the embodiment, the intermediate-gear support shaft 46 and the end plate 47 are formed in one piece from a single member, thus constituting a single item. It may also be possible to form the intermediate-gear support shaft 46 and the end plate 47 from independent bodies to fix to each other.

The one bearing 48 includes: an outer ring 48a; an inner ring 48b; and plural balls 48c as a rolling element rollably interposed between the inner ring 48b and the outer ring 48a. The other bearing 49 includes: an outer ring 49a; an inner ring 49b; and plural balls 49c as a rolling element rollably interposed between the inner ring 49b and the outer ring 49a. The bearings 48, 49 each comprise a deep groove ball bearing.

The second tubular portion 34 of the housing body 31 supports the aforesaid shaft unit. Specifically, an inner periphery of the entry aperture 34h of the second tubular portion 34 supports the first end 46a of the intermediate-gear support shaft 46 via the end plate 47. An inner periphery of the support hole 34i of the second tubular portion 34 directly supports a portion 46f adjoining the second end 46b of the intermediate-gear support shaft 46. The intermediate-gear support shaft 46 rotatably supports the intermediate gear 26 via the bearings 48, 49.

The intermediate gear 26 includes: a metal core 55 having a cylindrical shape; and a tooth portion 56 formed of an annular synthetic-resin member surrounding the metal core 55.

The tooth portion 56 is formed with plural helical teeth on an outer periphery thereof. The tooth portion 56 is formed shorter than the metal core 55 with respect to the axial direction S2. The tooth portion 56 has an inner periphery fixed to an outer periphery of the metal core 55 rotatable together with the metal core.

An inner periphery of the metal core 55 includes a smaller diameter portion 55a and a larger diameter portion 55b. The smaller diameter portion 55a and the larger diameter portion 55b are connected via an annular end wall 55c. The smaller diameter portion 55a is provided at one end of the inner periphery of the metal core 55 with respect to the axial direction S2 and arranged to adjoin the end plate 47. The larger diameter portion 55b is provided at the other end and an intermediate portion of the inner periphery of the metal core 55 with respect to the axial direction S2. The outer periphery of the metal core 55 is formed with an annular projection extended circumferentially of the metal core 55. The above annular projection connects the metal core 55 and the tooth portion 56. A circumferential groove extended circumferentially is formed at an end portion of the larger diameter 55b and opposite from the smaller diameter portion 55a. A snap ring 57 is fitted in this circumferential groove.

The inner periphery of the metal core 55 retains the bearings 48, 49. Specifically, the larger diameter portion 55b functions as a fit-engagement portion fitted on outer peripheries of the outer rings 48a, 49a of the two bearings 48, 49. The end wall 55c functions as a restricting portion which receives the one end face of the outer ring 48a of the one bearing 48 so as to prevent the outer ring 48a from moving in one direction of the axial direction S2. The snap ring 57 functions as a second restricting portion which receives the other end face of the outer ring 49a of the other bearing 49 so as to prevent the outer ring 49a from moving in the other direction of the axial direction S2.

Thus, the outer rings 48a, 49a of the two bearings 48, 49, and the spacer 50 are fitted in the larger diameter portion 55b of the inner periphery of the metal core 55 as arranged in the axial direction S2 and are clamped between the end wall 55c and the snap ring 57 with respect to the axial direction S2. As a result, the two bearings 48, 49 are prevented from moving to both sides of the axial directions S2. Further, the two bearings 48, 49 are also prevented from relative moving in the both sides of the axial direction S2.

The inner rings 48b, 49b of the two bearings 48, 49 are rotatably supported by the intermediate-gear support shaft 46 of the shaft unit and are prevented from relative moving to the intermediate-gear support shaft 46 in the axial direction S2.

The intermediate-gear support shaft 46 includes: a center axis 46d in parallel to the longitudinal direction thereof; and an outer periphery 58. The center axis 46d of the intermediate-gear support shaft 46 is aligned along the center axis 301 of the entry aperture 34h as the aforesaid first circle hole and the center axis 302 of the support hole 34i as the second circle hole.

In the intermediate portion 46c of the intermediate-gear support shaft 46, the outer periphery 58 includes: a restricting portion 58d for preventing the two bearings 48, 49 from moving in the axial direction S2; a fit-engagement portion 58e in which two bearings 48, 49 are fitted; an engagement portion 58f engaged with the fixing member 51 and the lock nut 52. The restricting portion 58d, the fit-engagement portion 58e, and the engagement portion 58f are arranged in this order in the axial direction S2 and are located in concentric relation with each other.

The restricting portion 58d is disposed to adjoin with the end plate 47 with respect to the axial direction S2 and is formed in a larger diameter than the fit-engagement portion 58e.

The fit-engagement portion 58e adjoins the restriction portion 58d with respect to the axial direction S2. The fit-engagement portion is connected to the restricting portion 58d via an end wall 58g and includes a cylindrical surface extended in parallel to the longitudinal direction and having a predetermined length.

The engagement portion 58f is formed with a male thread as a thread portion. The fixing member 51 and the lock nut 52 are threaded to this male thread.

The intermediate portion 46c of the intermediate-gear support shaft 46 retains the bearings 48, 49 in order to support the intermediate gear 26 via the two bearings 48, 49. Specifically, the restricting portion 58d functions as a restricting portion which receives the one end face of the inner ring 48b of the bearing 48 so as to prevent the inner ring 48b from moving in one direction of the axial direction S2. The fixing member 51 threaded to the male thread of the engagement portion 58f serves as a restricting portion which receives the other end face of the inner ring 49b of the bearing 49 so as to prevent the inner ring 49b from moving in the other direction of the axial direction S2. The two bearings 48, 49 and the spacer 50 interposed between the bearings 48, 49 are clamped between the fixing member 51 and the end wall 58. Thus, the two bearings 48, 49 are prevented from moving to the intermediate-gear support shaft 46 to the both sides of the axial direction S2. While the inner rings 48b, 49b of the two bearings 48, 49 are prevented from moving away from each other with respect to the axial direction S2, the inner rings are allowed to move relatively toward each other.

The fixing member 51 functions as a preloading member for applying a preload to the paired bearings 48, 49 retained in the aforementioned manner in the axial direction S2. As a result, the two bearings 48, 49 are removed of bearing clearance (play) so that the intermediate gear 26 is less prone to inclination in meshing engagement.

Specifically, the fixing portion 51 is threaded to the engagement portion 58f for adjusting the fixing member 51 to position with respect to the axial direction S2, thereby bringing the inner rings 48b, 49b closer to each other for adjusting a distance therebetween to a predetermined length. The distance between the inner rings 48b, 49b with respect to the axial direction S2, for example, is shorter than that between the outer rings 48a, 49a.

In this manner, a pressing force as a predetermined preload in the axial direction S2 may be applied to the bearings 48, 49. The inner ring 48b and the outer ring 48a of the bearing 48 are biased reversely each other to the axial direction S2. In the meantime, the inner ring 49b and the outer ring 49a of the bearing 49 are biased reversely each other to the axial direction S2. As a result, both the bearings 48, 49 are removed of bearing clearance.

In the intermediate portion 46c of the intermediate-gear support shaft 46, the outer periphery 58 of the intermediate-gear support shaft 46 includes an eccentric portion 58c eccentric to the center axis 46d of the intermediate-gear support shaft 46.

The eccentric portion 58c includes: the aforesaid restricting portion 58d; the aforesaid fit-engagement portion 58e and the aforesaid engagement portion 58f.

The outer periphery 58 of the intermediate-gear support shaft 46 includes a supported portion 58a directly supported by the second tubular portion 34 in the portion 46f adjoining the second end 46b of the intermediate-gear support shaft 46.

The supported portion 58a is disposed in adjoining relation with the engagement portion 58f with respect to the axial direction S2. The supported portion 58a is formed by a cylindrical surface having a smaller diameter than that of the eccentric portion 58c. The cylindrical surface has a center axis parallel to the longitudinal direction of the intermediate-gear support shaft 46. This center axis is equivalent to the center axis 46d of the above intermediate-gear support shaft 46.

The second end 46b of the intermediate-gear support shaft 46 is formed with an engaging portion 46g1 comprising a female thread. This engaging portion 46g1 is engaged with the fastening member 541 comprising a nut.

With respect to the longitudinal direction of the intermediate-gear support shaft 46, the engaging portion 46g1 is disposed on the outer periphery 58 at place shifted from the supported portion 58a toward a distal end of the shaft. The engaging portion 46g1 has a smaller diameter than that of the eccentric portion 58c and includes a male thread having a smaller diameter than that of the cylindrical surface of the supported portion 58a. This male thread is in threaded engagement with a female thread of the fastening member 541.

The first end 46a of the intermediate-gear support shaft 46 includes: a supported portion 46e supported by the second tubular portion 34 of the housing body 31 via the end plate 47; and a coupling portion 59 for operating the eccentric mechanism 53 as will be described hereinafter. The coupling portion 59 is disposed at a distal end of the intermediate-gear support shaft 46 with respect to the longitudinal direction thereof. The first end 46a and an outer periphery 47a of the end plate 47 are disposed in concentric relation with the center axis 46d of the intermediate-gear support shaft 46.

The end plate 47 is disposed at the first end 46a of the intermediate-gear support shaft 46 with respect to the longitudinal direction thereof. The end plate 47 comprises an annular plate member. The end plate 47 includes a pair of first main surface 47b and second main surface 47c that are opposing each other. The first main surface 47b is disposed in the second tubular portion 34 of the housing body 31. The second main surface 47c is disposed on the opposite side from the first main surface 47b and at place externally of the second tubular portion 34. The first main surface 47b and the second main surface 47c intersect the longitudinal direction of the intermediate-gear support shaft 46 at right angles. The end plate 47 includes the outer periphery 47a.

The outer periphery 47a includes: a fit-engagement portion 47d as a first portion fitted in the entry aperture 34h of the second tubular portion 34 of the housing body 31; and an adjoining portion 47e as a second portion adjoining the fit-engagement portion 47d with respect to the axial direction S2 and disposed externally of the second tubular portion 34.

The fit-engagement portion 47d is formed in a predetermined length from the first main surface 47b in the axial direction S2. The fit-engagement portion 47d includes a cylindrical surface endlessly continued in a circumferential direction. This cylindrical surface is disposed in a concentric relation with the center axis 46d of the intermediate-gear support shaft 46.

The fit-engagement portion 47d is formed with a circumferential groove endlessly continued in the circumferential direction. The circumferential groove is fitted with an O ring 60 as a seal member. The O ring 60 is elastic and continuously extended in the circumferential direction. The O ring 60 is interposed between the inner periphery of the entry aperture 34h of the second tubular portion 34 and the fit-engagement portion 47d of the outer periphery 47a of the end plate 47, as in an elastically deformed state, thereby elastically sealing a space therebetween.

Referring to FIG. 4 and FIG. 13, the end plate 47 includes an outside circumference end portion 47j forming the adjoining portion 47e of the outer periphery 47a.

The outside circumference end portion 47j is formed in a predetermined length from the second main surface 47c in the axial direction S2. The outside circumference end portion 47j has an oval shape as viewed in the axial direction S2. The oval shape includes: an arcuate portion as a portion having a relatively larger distance from the center axis 46d; and a straight line portion as a portion having a relatively shorter distance from the center axis 46d. It is noted that the outside circumference end portion 47j does not form the fit-engagement portion 47d of the outer periphery 47a.

The outside circumference end portion 47j includes two extension portions 47f extended to project radially outward from the fit-engagement portion 47d of the outer periphery 47a. The extension portions 47f forms the aforesaid arcuate portions. The outside circumference end portion 47j further includes two notches 47g1, 47g2 forming the aforesaid straight line portions. A one notch 47g1 is disposed in vicinity of the third tubular portion 35 to function as a relief portion relieved from the third tubular portion 35. In this embodiment, the two extension portions 47f and the two notches 47g1, 47g2 are alternately adjacently arranged in a circumferential direction. The two extension portions 47f are in point symmetrical shape about the center axis 46d. The notch 47g2 may be dispensed with.

The outside circumference end portion 47j functions as a cover portion for covering the end face 34d as the marginal portion of the entry aperture 34h. In this embodiment, the extension portion 47f of the outside circumference end portion 47j covers only a portion 34d1 which is a part of the end face 34d and overlaps with the extension portion 47f as viewed in the axial direction S2.

The two extension portions 47f are disposed on radially opposite sides. The outer periphery 47a corresponding to the extension portion 47f is formed in a cylindrical surface having a predetermined radius. This cylindrical surface is concentric with the fit-engagement portion 47d of the outer periphery 47a and has a larger diameter than that of the fit-engagement portion 47d. The cylindrical surface forms the maximum outside diameter of the outer periphery 47a and is connected to the fit-engagement portion 47d via an end face 47h.

The end face 47h is abutted against the end face 34d of the second tubular portion 34 to function as a received portion received by the end face 34d in the axial direction S2. The received portion is fastened to the end face 34d of the second tubular portion 34 by means of the fastening member 541 so as to be fixed in a fastened state in the axial direction S2.

The two notches 47g1, 47g2 are disposed on radially opposite sides and are formed in the same shape. The following description is made with reference to the notch 47g1.

The notch 47g1 includes: a portion extending radially outward from the fit-engagement portion 47d of the outer periphery 47a; and a portion recessed radially inward from the fit-engagement portion 47d of the outer periphery 47a. The recessed portion exposes the other portion 34d2 other than the portion 34d1 of the end face 34d of the second tubular portion 34. The recessed portion is connected to the fit-engagement portion 47d via an end face 47i.

Returning to FIG. 13, the fastening member 541 is disposed at the second end 46b of the intermediate-gear support shaft 46 on the opposite side from the end plate 47 with respect to the axial direction S2. The fastening member is disposed outside of the second tubular portion 34 to adjoin with a bottom 34g of the second tubular portion 34. The bottom 34g is open with respect to an outer side of the second tubular portion 34. The fastening member 541 may be attached from the outside of the second tubular portion 34 to the intermediate-gear support shaft 46.

The fastening member 541 is a nut as a closed-end cylindrical member. An inner periphery of the fastening member 541 is formed with a female thread as an engaging portion 54b. The female thread is threaded to the male thread of the engaging portion 46g1 of the end 46b of the intermediate-gear support shaft 46. An outer periphery of the fastening member 541 includes a tool engaging portion 54c which is engageable with a tool for threading the fastening member 541 to the intermediate-gear support shaft 46. This tool engaging portion 54c includes planes opposing each other. The fastening member 541 is threadedly engaged with the intermediate-gear support shaft 46 thereby fastening the second end 46b of the intermediate-gear support shaft 46 to the bottom 34g of the second tubular portion 34 of the housing body 31 at an optional rotational position.

The fastening mechanism 74 includes: the fastening member 541 as the pressing member; the end plate 47; and the second tubular portion 34. Specifically, the fastening member 541 and the end plate 47 are connected with each other via the intermediate-gear support shaft 46. In addition, the second tubular portion 34 is clamped between the fastening member 541 and the end plate 47. The fastening member 541 is threadedly engaged with the intermediate-gear support shaft 46, whereby the intermediate-gear support shaft 46 is pulled in the axial direction S2 so as to bring the fastening member 541 and the end plate 47 closer to each other. As a result an end face 54a of the fastening member 541 is abutted against the end face 34e of the bottom 34g of the second tubular portion 34, whereas the end face 47h as the received portion of the end plate 47 is abutted against the end face 34d of the second tubular portion 34. Thus, the intermediate-gear support shaft 46 is secured to the second tubular portion 34.

Referring to FIG. 13 and FIG. 7, the second tubular portion 34 includes: a main body 34f as a tubular portion extended in the axial direction S2; and the bottom 34g disposed at the second end 34c thereof with respect to the axial direction S2. The second tubular portion 34 includes an inner periphery 61.

The inner periphery 61 includes: a first portion 61a as a fit-engagement portion fitted with the outer periphery 47a of the end plate 47; a second portion 61b adjoining the first portion 61a in the axial direction S2 and surrounding the tooth portion 56 of the intermediate gear 26; a third portion 61c adjoining the second portion 61b in the axial direction S2 and surrounding the fixing member 41 and the lock nut 42; and a fourth portion 61d as a fit-engagement portion fitted with the intermediate-gear support shaft 46. The first, second and third portions 61a, 61b, 61c are formed at the main body 34f. The fourth portion 61d is formed at the bottom 34g. The first portion 61a, the second portion 61b, the third portion 61c and the fourth portion 61d are adjacently arranged in this order from the side of the first end 34b along the axial direction S2 and are sequentially decreased in diameter.

The first portion 61a is disposed at the first end 34b as one end with respect to the axial direction S2 and comprises a cylindrical surface endlessly continued in the circumferential direction. The fit-engagement portion 47d of the outer periphery 47a of the end plate 47 is fitted in the first portion 61a without play. The first portion 61a forms the entry aperture 34h and is equivalent to the inner periphery of the entry aperture 34h (also referred to as the inner periphery 61a of the entry aperture 34h).

The second portion 61b is formed with an opening, through which the second tubular portion 34 is communicated with the interiors of the first tubular portion 33 and the third tubular portion 35.

The third portion 61c is a portion of the metal core 55 of the intermediate gear 26 and surround a projected portion from an end face of the tooth portion 56 in the axial direction S2. The third portion 61c includes curved projections projected radially inward in correspondence to the first tubular portion 33 and the third tubular portion 35.

The fourth portion 61d comprises a cylindrical surface and forms the support hole 34i to correspond to an inner periphery of the support hole 34i (also referred to as the inner periphery 61d of the support hole 34i). The supported portion 58a of the outer periphery 58 of the intermediate-gear support shaft 46 is fitted in the fourth portion 61d so as to be supported.

The entry aperture 34h as the first circle hole and the support hole 34i as the second circle hole are aligned coaxially with each other. A center axis of an inner periphery of the first tubular portion 33 is disposed in parallel to a center axis of an inner periphery of the third tubular portion 35.

The end face 34d as the marginal portion of the entry aperture 34h (also referred to as an entry margin of the entry aperture) is formed in an annular flat surface and intersects a center axis of the inner periphery 61a of the entry aperture 34h at right angles. The end face 34e as the marginal portion of the support hole 34i is disposed on an outside surface of the bottom 34g. The end face 34e is formed in an annular flat surface and intersects a center axis of the inner periphery 61d of the support hole 34i at right angles.

FIG. 14 is an enlarged view of the principal part of FIG. 5, mainly showing the driven gear 27. Referring to FIG. 14, the electric power steering apparatus 1 includes: the driven-gear support shaft 62 as a third shaft for supporting the driven gear 27; plural bearings 63, 64 for rotatably supporting the driven gear 27; and two fixing members 65, 66 for restricting the axial movement of the bearings 63, 64.

The third tubular portion 35 retains the two bearings 63, 64, which rotatably support the driven-gear support shaft 62. A one bearing 63 includes: an outer ring 63a; an inner ring 63b; and a plurality of balls 63c as a rolling element rollably interposed between the inner ring 63b and the outer ring 63a. The other bearing 64 includes: an outer ring 64a; a pair of inner rings 64b, 64d; and a plurality of balls 64c as a rolling element rollably interposed between the inner rings 64b, 64d and the outer ring 64a. The other bearing 64 is prevented from moving to the driven-gear support shaft 62 and the housing body 31 in both sides of the axial direction S3 by means of the fixing members 65, 66. The driven-gear support shaft 62 is coupled to rotate together with the driven gear 27 and supports the driven gear 27. Further, the driven-gear support shaft 62 is coupled to the nut 28 to rotate together. In this embodiment, the driven-gear support shaft 62 is formed with the nut 28 in one piece. The nut 28 drives the thread shaft 30 via the balls 29.

The driven gear 27 is formed of a metal and has an annular shape. An outer periphery of the driven gear 27 is formed with plural helical teeth.

The driven-gear support shaft 62 has a tubular shape and extends in the axial direction S3. An outer periphery 67 of the driven-gear support shaft 62 includes: a first portion 67a fitted with the one bearing 63; a second portion 67b corresponding to an outer periphery of the nut 28; a third portion 67c fitted with the driven gear 27; a fourth portion 67d forming a maximum outside diameter portion of the driven-gear support shaft 62; a fifth portion 67e having a smaller diameter than that of the fourth portion 67d and fitted with the other bearing 64; and a sixth portion 67f as a threaded portion formed with a male thread.

The first to sixth portions 67a, 67b, 67c, 67d, 67e, 67f are arranged in this order in the axial direction S3. The diameters of the first, second, third, fifth and sixth portions 67a, 67b, 67c, 67e, 67f are progressively decreased as the distance from the fourth portion 67d increases in the axial direction S3. The third portion 67c and the fourth portion 67d are connected via an end wall 67g. The fourth portion 67d and the fifth portion 67e are connected via an end wall 67h.

The driven-gear support shaft 62 is rotatably supported by the two bearings 63, 64 retained by the first and fifth portions 67a, 67e of the outer periphery 67.

The third portion 67c of the outer periphery 67 of the driven-gear support shaft 62 is formed with a cylindrical surface. The third portion 67c is fixed in an inner periphery of the driven gear 27 by press insertion. In this manner, the relative movement and the relative rotation between the driven gear 27 and the driven-gear support shaft 62 are prevented. The lateral side of the driven gear 27 is abutted against the end wall 67g.

The fifth portion 67e is formed in a cylindrical surface. The fifth portion 67e is fitted in inner peripheries of the paired inner rings 64b, 64d of the bearing 64. The one end face of the one inner ring 64b of the bearing 64 is abutted against the end wall 67h.

The male thread of the sixth portion 67f is threadedly engaged with the fixing member 65.

The fixing member 65 has an annular shape and an inner periphery which is formed with a female thread. An end face of the fixing member 65 is abutted against an end face of the other inner ring 64d of the bearing 64, so as to abut the end face. With respect to the axial direction S3, the fixing member 65 and the end wall 67h fixingly clamp the paired inner rings 64b, 64d of the bearing 64 therebetween.

The nut 28 is formed integrally with the driven-gear support shaft 62 and is supported by the third tubular portion 35 via the driven-gear support shaft 62.

The thread shaft 30 is threadedly engaged with the nut 28 and is disposed in concentric relation with the nut 28. In a state where the thread shaft 30 restricted from rotating about its axis, the nut 28 is rotated relative to the thread shaft 30 about the axis of the thread shaft 30, whereby the nut 28 and the thread shaft 30 may be moved relative to each other in the axial direction S3. The thread shaft 30 and the rack bar 14 are disposed in concentric relation and formed in one piece.

The rack bar 14, the thread shaft 30, the nut 28, the driven-gear support shaft 62 and the driven gear 27 are disposed in concentric relation with the third tubular portion 35 of the housing body 31 via the paired bearings 63, 64, and are supported by the third tubular portion 35.

The one bearing 63 comprises a deep groove ball bearing. The other bearing 64 comprises a double-row outer angular-contact ball bearing.

The outer ring 64a of the bearing 64 includes two raceway grooves. The paired inner rings 64b, 64d of the bearing 64 each include one raceway groove. A first raceway groove of the outer ring 64a and the one raceway groove of the first inner ring 64b oppose each other while the plural balls 64c are interposed between these raceway grooves. The other raceway groove of the outer ring 64a and the other raceway groove of the second inner ring 64d oppose each other while the plural balls 64c are interposed between these raceway grooves. In this manner, the bearing 64 has the two ball rows. In a state where the paired inner rings 64b, 64d are abutted against each other at the mutually opposing end faces thereof, the individual balls 64c are in contact with corresponding raceway grooves of the inner rings 64b, 64d and the outer ring 64a while applied with a predetermined preload.

The predetermined preload is applied to the bearing 64 with respect to the axial direction S3. Specifically, the fixing member 65 is threadedly engaged with the male thread of the sixth portion 67f of the outer periphery 67 of the driven-gear support shaft 62, whereby the paired inner rings 64b, 64d are clamped between the fixing member 65 and the end wall 67h so that the mutually opposing end faces of the paired inner rings 64b, 64d are abutted against each other. Thus, the individual balls 64c are held in contact with the corresponding raceway grooves of the inner rings 64b, 64d and the outer ring 64a and pressingly biased in reversely of the axial direction S3 by means of the corresponding raceway grooves of the inner rings 64b, 64d and the outer ring 64a. As a result, clearance (play) between the individual balls 64c and the corresponding raceway grooves is eliminated. The outer ring 64a of the bearing 64 is fixed to the third tubular portion 35, as will be described hereinafter.

The inner periphery 68 of the third tubular portion 35 includes: a first portion 68a disposed at the first end 35b with respect to the axial direction S3 and forming the minimum inside diameter of the inner periphery 68; a second portion 68b adjoining the first portion 68a and retaining the one bearing 63; a third portion 68c adjoining the second portion 68b and accommodating the nut 28; a fourth portion 68d adjoining the third portion 68c and accommodating the driven gear 27; a fifth portion 68e adjoining the fourth portion 68d and accommodating the other bearing 64; a sixth portion 68f adjoining the fifth portion 68e and as a thread portion formed with a female thread; and a seventh portion 68g adjoining the sixth portion 68f and formed with a cylindrical surface.

These portions from the first to the seventh portions, 68a, 68b, 68c, 68d, 68e, 68f, 68g are adjacently arranged in the order as described above from the first end 35b to the second end 35c of the third tubular portion 35 with respect to the axial direction S3. These portions are progressively increased in diameter in the described order. The first portion 68a and the second portion 68b are connected via an end wall 68h. The fourth portion 68d and the fifth portion 68e are connected via an end wall 68i.

The second portion 68b of the inner periphery 68 of the third tubular portion 35 is formed in a cylindrical surface and is fitted about an outer periphery of the outer ring 63a of the bearing 63 so as to receive the outer periphery thereof. The end face of the outer ring 63a is abutted against the end wall 68h. Thus, the bearing 63 is prevented from moving to the third tubular portion 35 in one direction of the axial direction S3.

An inside diameter of the third portion 68c is larger than the maximum outside diameter of the nut 28.

The fourth portion 68d has an arcuate section as viewed in the axial direction S3. The fourth portion is communicated with the interior of the second tubular portion 34 via space between the respective arcuate ends of the tubular portions.

The fifth portion 68e is formed with a cylindrical surface endlessly continued in a circumferential direction. The fifth portion 68e is fitted with an outer periphery of the outer ring 64a of the bearing 64 and an outer periphery of an annular spacer 69.

The fixing member 66 is threaded into the female thread of the sixth portion 68f. The fixing member 66 has an annular shape and is formed with a male thread on an outer periphery thereof. The fixing member 66 is threaded into the female thread of the sixth portion 68f, whereby the outer ring 64a of the bearing 64 is clamped between the end wall 68i and the fixing member 66 via the spacer 69 with respect to the axial direction S3. As a result, the bearing 64 is prevented from moving to the third tubular portion 35 in both directions of the axial direction S3.

The annular projection 32b2 of the end cover 32 is fitted in the seventh portion 68g.

These first to seventh portions 68a, 68b, 68c, 68d, 68e, 68f, 68g define the third housing space 35a therein. The third housing space 35a is opened to the opposite sides with respect to the axial direction S3. The driven gear 27 and the driven-gear support shaft 62 are accommodated in the third housing space 35a, through which the thread shaft 30 is inserted.

Referring to FIG. 14 and FIG. 9B, the third tubular portion 35 includes the extension portion 70 as a tubular portion extended by a predetermined length from an axial position of the end face 34d of the second tubular portion 34 toward the first end 35b with respect to the axial direction S3. The rack bar 14 is inserted through the extension portion 70, which accommodates the nut 28 therein.

Referring to FIG. 7 and FIG. 9C, the extension portion 70 includes: a plurality of thin wall portions 70a having a smaller radial thickness; and a plurality of thick wall portions 70b radially projected relative to the thin wall portions and having a larger radial thickness. The thin wall portions 70a and the thick wall portions 70b are alternately arranged in a circumferential direction of the third tubular portion 35. The plural thin wall portions 70 are circumferentially arranged with equal spacing, while the plural thick wall portions 70b are circumferentially arranged with equal spacing.

The thick wall portion 70b is formed with a screw hole 71 as a connecting portion. This screw hole 71 is formed with a female thread and has a bolt threaded therein, whereby the first housing 20 and the second housing 21 are coupled together (see FIG. 2).

Two thick wall portions 70b circumferentially adjoining each other and a thin wall portion 70a therebetween forms radially recessed concave portions 70c, 70d, 70e. In this embodiment, these concave portions 70c, 70d, 70e are provided at three places.

As viewed in the axial direction S3, the plural thick wall portions 70b are located at such positions that avoid overlapping with the second tubular portion 34. Out of the three concave portions 70c, 70d, 70e, the concave portion 70c closest to the second tubular portion 34 functions as a relief portion for relieving interference with the end plate 47.

The concave portion 70c as the relief portion is formed in a shape that cut away a circumferential part of the thin wall portion 70a along a recessed curve. The concave portion 70c has a gutter-like shape extended along the axial direction S3 to form a recessed curve. As viewed in the axial direction S3, the concave portion 70c has an arcuate section.

The center of a curvature radius of the recessed curve (such as a cylindrical surface) defined by the concave portion 70c is disposed concentrical with the center of the inner periphery of the entry aperture 34h of the second tubular portion 34. The curvature radius of the recessed curve (such as a cylindrical surface) defined by the concave portion 70c is equal to or larger than the radius of the inner periphery of the entry aperture 34h. The concave portion 70c as the relief portion and the notch 47g1 as a relief portion to be described hereinafter are provided for permitting to operate the eccentric mechanism 53.

Figure 15A:
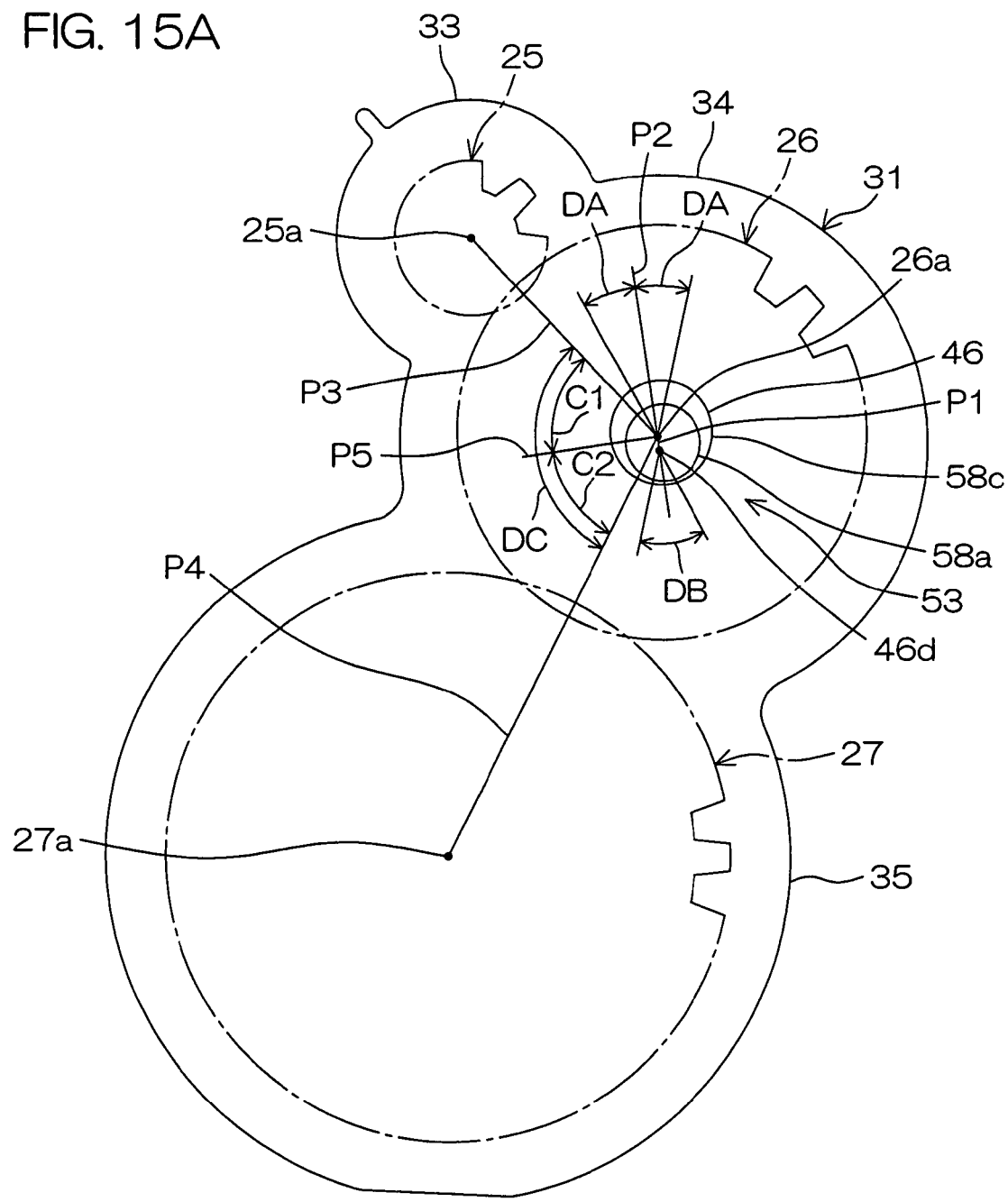
FIG. 15A is a schematic diagram of reduction gears and an eccentric mechanism shown in FIG. 6, FIG. 15B diagrammatically explaining a relation between a first plane and a second plane.

FIG. 15A is a schematic diagram of the reduction gears 19 and the eccentric mechanism 53 shown in FIG. 6. Referring to FIG. 13 and FIG. 15A, the eccentric mechanism 53 includes: the intermediate-gear support shaft 46; the end plate 47; and the entry aperture 34h and support hole 34i as the first and second circle holes having the respective center axes 301, 302 aligned with the axis of the second tubular portion 34. A center axis (equivalent to the center axis 26a of the intermediate gear 26) of the eccentric portion 58c of the outer periphery 58 of the intermediate-gear support shaft 46 may be moved by rotating the intermediate-gear support shaft 46 about its center axis 46d. At this time, the center axis of the eccentric portion 58c is moved along an arcuate path about the center axis 46d. This allows the eccentric mechanism 53 to move the center axis 26a of the intermediate gear 26 in parallel to the center axes 25a, 27a of the driving gear 25 and the driven gear 27, thereby eccentrically positioning the center axis 26a for accomplishing the positional adjustment.

According to the embodiment, the positions of the center axis 25a of the driving gear 25 and the center axis 27a of the driven gear 27 to the housing body 31 are restricted. On the other hand, the center axis 26a of the intermediate gear 26 is allowed to be position-adjusted to the housing body 31 by means of the eccentric mechanism 53. Thus, the center axis 26a of the intermediate gear 26 may be moved toward or away from the center axis 25a of the driving gear 25. Similarly, the center axis 26a of the intermediate gear 26 may be moved toward or away from the center axis 27a of the driven gear 27. Accordingly, the amount of backlash between the driving gear 25 and the intermediate gear 26 may be adjusted. Further, the amount of backlash between the driven gear 27 and the intermediate gear 26 may be adjusted.

In the eccentric mechanism 53 as shown in FIG. 13 and FIG. 15A, the intermediate-gear support shaft 46 is supported by the coaxially entry aperture 34h and the support hole 34i, so that the intermediate-gear support shaft 46 is adapted for the adjustable for the rotational position thereof. In a state where the intermediate-gear support shaft 46 is not fixed to the second tubular portion 34 of the housing body 31, the rotational position of the intermediate-gear support shaft 46 may be adjusted by rotating the intermediate-gear support shaft 46 about the center axis 46d thereof coaxially with the entry aperture 34h and support hole 34i. In a state where the intermediate-gear support shaft 46 is fixed to the second tubular portion 34, the intermediate-gear support shaft 46 cannot be rotated.

In this manner, the rotational position of the intermediate-gear support shaft 46 is adjusted whereby the position of the center axis (equivalent to the center axis 26a of the intermediate gear 26) of the eccentric portion 58c of the outer periphery 58 may be adjusted to the center axis 46d. Furthermore, the position of the intermediate gear 26 may be adjusted to the driving gear 25 and the driven gear 27 which are positioned to the housing body 31.

The respective center axes 25a, 26a, 27a of the gears 25, 26, 27 and the center axis 46d of the intermediate-gear support shaft 46 are disposed as follows such that both the backlash between the intermediate gear 26 and the driving gear 25 and the backlash between the intermediate gear 26 and the driven gear 27 may be increasingly (or decreasingly) adjusted substantially by the same amount when the position of the intermediate gear 26 is adjusted.

A first plane P1 is assumed that includes the center axis 46d of the intermediate-gear support shaft 46 and the center axis 26a of the intermediate gear 26. Further, a second plane P2 is assumed that is orthogonal to a fifth plane P5 to be described as below and including the center axis 26a of the intermediate gear 26.

The fifth plane P5 is also referred to as a predetermined angle-bisecting plane. Specifically, the fifth plane P5 (the predetermined angle-bisecting plane) bisects an angle DC formed between a third plane P3 including the center axis 25a of the driving gear 25 and the center axis 26a of the intermediate gear 26 and a fourth plane P4 including the center axis 27a of the driven gear 27 and the center axis 26a of the intermediate gear 26, and passes the center axis 26a of the intermediate gear 26.

In short, the fifth plane is defined as follows. The fifth plane P5 is a plane including the center axis 26a of the intermediate gear 26. The fifth plane P5 is orthogonal to the second plane P2. An angle C1 formed between the third plane P3 and the fifth plane P5 is defined to be equal to an angle C2 formed between the fourth plane P4 and the fifth plane P5.

An adjustable range of the rotational position of the intermediate-gear support shaft 46 is limited to a predetermined range DB of rotational position, as will be described hereinafter. When the rotational position of the intermediate-gear support shaft 46 is adjusted within this range DB, the center axis 26a of the intermediate gear 26, as viewed in the axial direction S2, is moved along an arcuate path about the center axis 46d. When the rotational position of the intermediate-gear support shaft 46 is adjusted to the center of the range DB, the first plane P1 coincides with the second plane P2.

When the rotational position of the intermediate-gear support shaft 46 is adjusted to the range DB, the first plane P1 is set to intersect the second plane P2 at an angle in the range of 0° to a predetermined value (degree), say 15°. The predetermined value means an angle at which the first plane P1 intersects the second plane P2 when the rotational position of the intermediate-gear support shaft 46 is adjusted to an end of the range DB. Hence, the predetermined value means one half of the angle of the range DB or an angle approximating the angle.

Figure 15B:
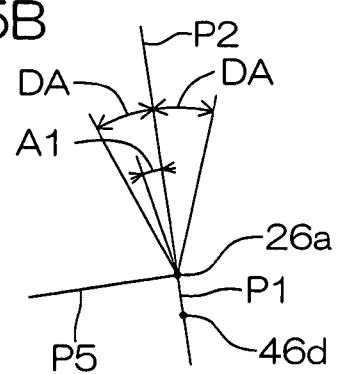

In the embodiment, rotational position of the intermediate-gear support shaft 46 is adjusted in the limited range of rotational position DB, the invention is not limited thereto. The first plane P1 may be set to intersect the second plane P2 at an angle A1 in the range of 0 to 30° in a state where the position is adjusted, as shown in FIG. 15B, for example. Alternatively, the adjustable range of rotational position of the intermediate-gear support shaft 46 may be set within an angular range of +15° with respect to a center position where the first plane P1 and the second plane P2 coincide with each other.

So long as these conditions are satisfied, the backlash may be adjusted easily because when the rotational position of the intermediate-gear support shaft 46 is adjusted within the aforementioned range, the center axis 26a of the intermediate gear 26 may be moved toward or away from both the center axis 25a of the driving gear 25 and the center axis 27a of the driven gear 27 substantially by the same distance.

According to the embodiment, the eccentric mechanism 53 intends to adjust the individual gears 25, 26, 27 within the following backlash tolerances. Thus, it is ensured that both the backlash between the intermediate gear 26 and the driving gear 25 and the backlash between the intermediate gear 26 and the driven gear 27 may be set in a predetermined optimum range.

First, in a state where the rotational position of the intermediate-gear support shaft 46 is adjusted to the center position of the above range DB, a first predetermined tolerance is set to the backlash between the intermediate gear 26 and the driving gear 25. In the above predetermined state, a second predetermined tolerance is set to the backlash between the intermediate gear 26 and the driven gear 27. The first tolerance and the second tolerance are set the same way, or set within the same range between a predetermined value and zero, for example.

For instance, tolerances of over pin diameters of the individual gears 25, 26, 27 are set such that each of the aforementioned backlashes may be achieved in the range of tolerance if the aforementioned predetermined state is realized and the individual parts are obtained in standard dimensions.

With the backlash tolerances thus set, the above two backlashes substantially of the same value may be normally obtained in assembly in the aforementioned predetermined state, so that a difference between the two backlashes is also decreased. Therefore, if the two backlashes are both increasingly or decreasingly adjusted by means of the eccentric mechanism 53, both of the two backlashes may be adjusted to the minimum value as the optimum value. A case where the difference between the two backlashes is as large as the maximum value of the tolerance may be encountered depending upon a combination of the parts. Even in such a case, it is possible to adjust at least one of the backlashes to the minimum value as the optimum value.

After the intermediate gear 26 is adjusted in position by means of the eccentric mechanism 53, the intermediate-gear support shaft 46 is fixed to the housing body 31 by means of the fastening member 541 of the fastening mechanism 74. Thus, the intermediate gear 26 may be fixed to a position to incapable of position adjustment.

Figure 16:
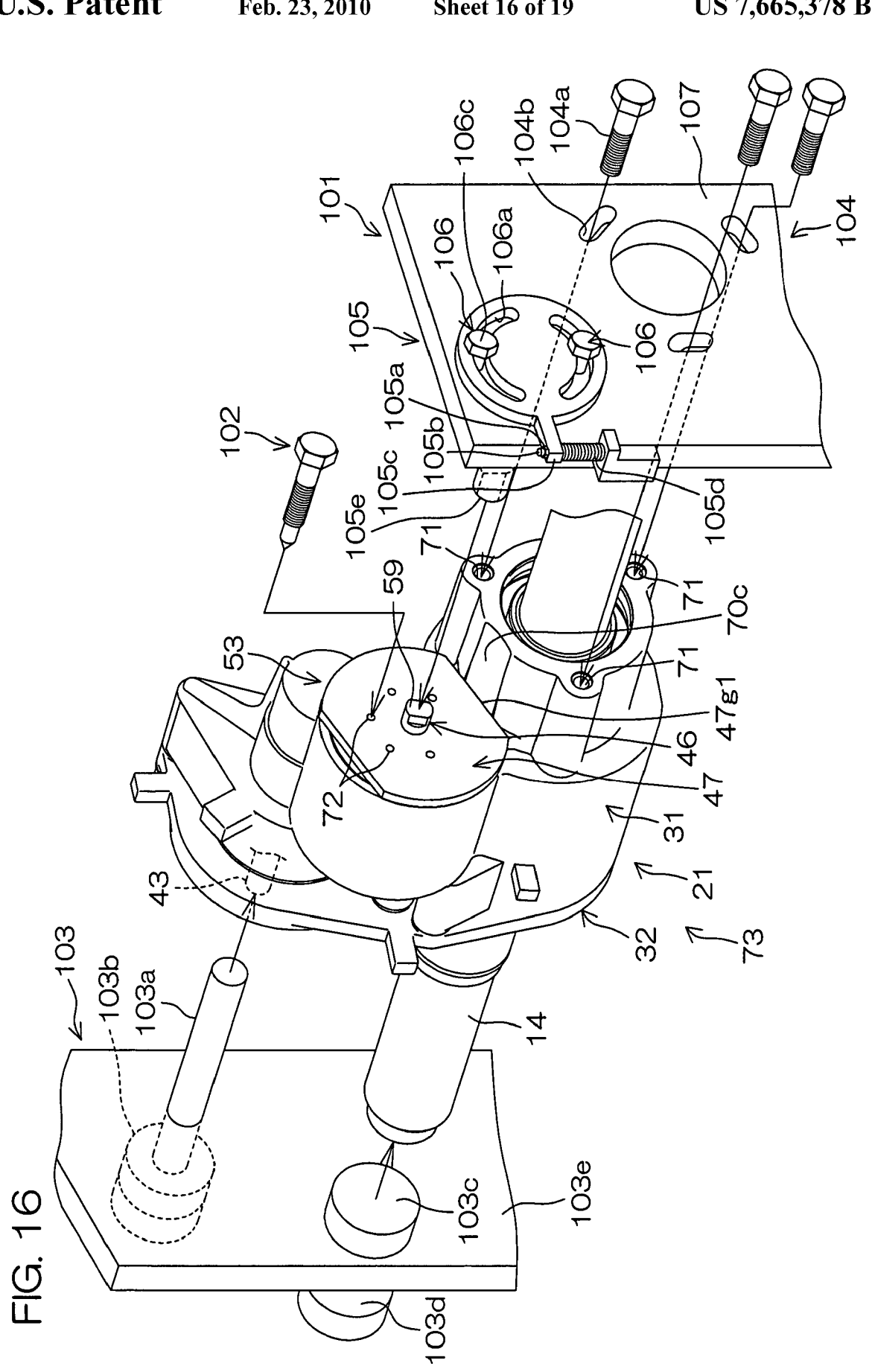
FIG. 16 is an exploded perspective view of the eccentric mechanism shown in FIG. 15A and an adjusting jig.

FIG. 16 is an exploded perspective view of the eccentric mechanism 53 shown in FIG. 15A and an adjusting jig. Referring to FIG. 16 and FIG. 5A, the eccentric mechanism 53 of the embodiment independently measures the backlash between the intermediate gear 26 and the driving gear 25 and the backlash between the intermediate gear 26 and the driven gear 27 in a state where the intermediate-gear support shaft 46 at the adjusted rotational position is inhibited from rotating, as will be described hereinafter. Accordingly, the embodiment employs a rotating jig 101 which rotates the intermediate-gear support shaft 46 to any rotational position and halts the intermediate-gear support shaft 46 at this rotational position.

The jig also inhibits the relative rotation between the intermediate-gear support shaft 46 and the intermediate gear 26 in the measurement of the backlash. This embodiment employs a restricting member 102 as a jig for restricting the relative rotation between the intermediate-gear support shaft 46 and the intermediate gear 26, and a measurement jig 103 for measuring the backlash.

The eccentric mechanism 53 includes: a restricting-member mounting portion 72 for mounting the restricting member 102; and a coupling portion 59 for coupling to the rotating jig 101.

When the rotational position of the intermediate-gear support shaft 46 is adjusted, interference between the third tubular portion 35 and the end plate 47 may occur corresponding to the predetermined range DB of rotational position of the intermediate-gear support shaft 46 (see FIG. 15A).

According to the embodiment, as shown in FIG. 4 and FIG. 13, the third tubular portion 35 of the housing body 31 is provided with the concave portion 70c as the relief portion in order to prevent the interference between the third tubular portion 35 and the end plate 47. The end plate 47 is also provided with the notch 47g1 as the relief portion. When the intermediate-gear support shaft 46 is at a rotational position within the predetermined rotational-position range DB, the concave portion 70c and the notch 47g1 oppose each other as spaced from each other.

The eccentric mechanism 53 further includes a stopper 75 for preventing the intermediate-gear support shaft 46 from rotating beyond the predetermined rotational-position range DB. The stopper 75 comprises a pair of projections disposed at the concave portion 70c. If the intermediate-gear support shaft 46 is rotated in one direction beyond the end of the predetermined rotational-position range DB, either one of the stoppers 75 corresponding to the rotational direction is abutted against the notch 47g1. The paired stoppers 75 prevent rotation at both ends end of the predetermined rotational-position range DB. Thus, the predetermined rotational-position range DB of the intermediate-gear support shaft 46 is limited, so that the intermediate-gear support shaft 46 is prevented from being rotated to an improper rotational position.

Referring to FIG. 4 and FIG. 15A, the aforesaid fifth plane P5 (the predetermined angle-bisecting plane) and the first plane P1 intersect orthogonally to each other with respect to the center position of the predetermined rotational-position range DB restricted by the pair of stoppers 75.

Returning to FIG. 16, the adjustment of rotational position of the intermediate-gear support shaft 46 and the backlash adjustment in the embodiment are performed on a unit 73 as an adjustment subject, which is (also referred to as a subassembly or manufacturing intermediary assembly) a unit assembly of the steering mechanism 5.

Referring to FIG. 5 and FIG. 16, the unit 73 has an arrangement wherein the driving gear 25, the intermediate gear 26 and the driven gear 27 are assembled in the second housing 21 but the electric motor 18 is disassembled. The fastening member 541 is disassembled, or attached to the intermediate-gear support shaft 46.

FIG. 17A and FIG. 17B are a front elevation and a side elevation, respectively, of the rotating jig shown in FIG. 16. Referring to FIG. 16, FIG. 17A and FIG. 17B, the rotating jig 101 includes: a fixing portion 104 for fixing the housing body 31; a rotating portion 105 for rotating the coupling portion 59 of the unit 73 fixed to the fixing portion 104; a restricting portion 106 for restricting the rotation of the rotating portion 105; and a supporting member 107 for supporting these components.

The fixing portion 104 includes: a fixing bolt 104a; and a through-hole 104b formed in the supporting member 107. The fixing bolt 104a is inserted through the through-hole 104b so as to be threaded into the screw hole 71 of the unit 73. The screw hole 71 is provided at the end face 35d of the third tubular portion 35 of the housing body 31. Thus, the housing body 31 is fixed to the supporting member 107. The screw hole 71 serves the dual purposes of connecting the first housing 20 and the second housing 21, as described above, and of fixing to the rotating jig 101.

The rotating portion 105 includes: a nut 105a as an input portion for manually inputting a rotary motion; a male thread member 105b threadedly engaged with the nut 105a; an arm 105c engaged with the nut 105a; a spring 105d as a biasing member for biasing the arm 105c toward the nut 105a; and an output shaft 105e as an output portion coupled rotatable together with the arm 105c.

The output shaft 105e is rotatably supported by the supporting member 107. The output shaft 105e has a power transmission face closely contactable to the coupling portion 59.

The coupling portion 59 is disposed at an end of the intermediate-gear support shaft 46 to project from the end plate 47 in the axial direction S2. The coupling portion 59 has a pair of flat faces as a power transmission surface. The paired flat faces are disposed parallel to each other and spaced away from each other by a predetermined distance, thus forming a bilateral width flat. The coupling portion 59 is free to switch connection with or disconnection disconnected from the output shaft 105e of the rotating jig 101. The coupling portion 59 can be connected with the rotating jig 101 for adjusting the rotational position of the intermediate-gear support shaft 46. The coupling portion 59 is also adapted for disconnection after completion of the adjustment operation. The coupling portion 59 may also be provided on the end plate 47.

The male thread member 105b has one end fixed to the supporting member 107. The nut 105a is threaded to the other end of the male thread member 105b. The male thread member 105b constitutes a thread mechanism to decelerate and the rotary motion inputted to the nut 105a in cooperation with. The spring 105d biases the arm 105c toward the nut 105a, thereby maintaining the engaging state between the arm 105c and the nut 105a.

When the nut 105a is turned, the nut 105a is linearly moved along an axis of the male thread member 105b, accordingly the arm 105c and the output shaft 105e rotate. At this time, the rotational angle of the output shaft 105e is reduced in comparison to the rotational angle of the nut 105a so that the rotational position of the intermediate-gear support shaft 46 coupled to the output shaft 105e may be adjusted by a minute angle. When the nut 105a is turned in either direction, the nut 105a and the arm 105c are moved associated with each other and hence, the rotational position of the intermediate-gear support shaft 46 may be adjusted the same way with respect to either direction.

The restricting portion 106 is provided for restricting the rotation of the intermediate-gear support shaft 46. The restricting portion 106 includes: an elongate hole 106a as a through-hole formed at the output shaft 105e and extended in an arcuate form; a female thread 106b formed at the supporting member 107; and a fixing bolt 106c inserted through the elongate hole 106a so as to be threaded into the female thread 106b. The rotation of the output shaft 105e and the rotation of the intermediate-gear support shaft 46 coupled thereto may be restricted by tightening the fixing bolt 106c.

Figure 18:
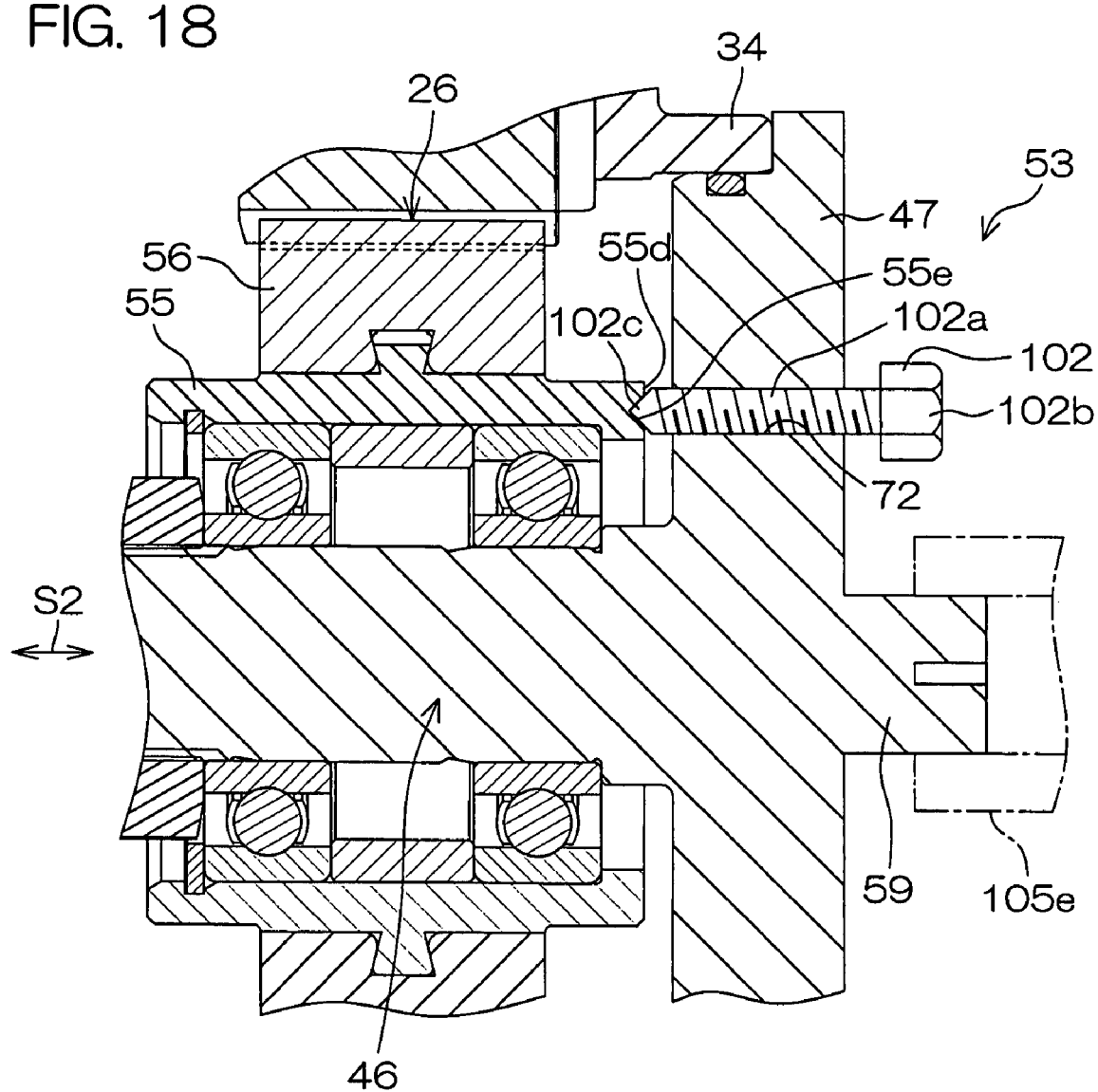
FIG. 18 is an enlarged view showing an adjusted state of a principal part of the eccentric mechanism shown in FIG. 15A.

FIG. 18 is an enlarged view showing an adjusted state of a principal part of the eccentric mechanism 53 shown in FIG. 15A.

Referring to FIG. 16 and FIG. 18, the restricting member 102 is a bolt having a tip formed conical. The restricting member 102 includes: a shaft 102a formed with a male thread; a head 102b as an operating portion provided at an end of the shaft 102a; and a projection 102c as an engaging portion provided at the tip of the shaft 102a in a conical shape.

In the state where the restricting member 102 fixed to the restricting-member mounting portion 72 of the end plate 47, the projection 102c is adapted to engage with a recess 55e as an engagement portion of the intermediate gear 26. This recess 55e is formed in a conical shape at an end face 55d of the metal core 55.

The restricting-member mounting portion 72 is provided at the end plate 47 and comprises a screw hole formed with a female thread. The screw holes are disposed at plural places, individually having different distances from the center axis

46d. Any one of the plural screw holes is selectively used as needed. The restricting-member mounting portion 72 is so disposed as to oppose the recess 55e when the intermediate gear 26 is rotated about the intermediate-gear support shaft 46 as needed. This allows the projection 102c at the tip of the restricting member 102 threaded into the selected screw hole to engage with the recess 55e of the intermediate gear 26.

When the restricting member 102 is threaded into the screw hole of the restricting-member mounting portion 72, the projection 102c at the tip of the restricting member 102 is engaged with the recess 55e of the intermediate gear 26 and abutted to adhere therewith. As a result, the intermediate gear 26 is inhibited from rotating to the intermediate-gear support shaft 46 and the end plate 47.

Referring to FIG. 16 and FIG. 12, the measurement jig 103 includes: a first driving portion 103a for rotating the driving gear 25; a first measurement portion 103b for measuring on the rotational angle of the driving gear 25 driven by the first driving portion 103a; a second driving portion 103c for rotating the driven gear 27; a second measurement portion 103d for measuring on the rotational angle of the driven gear 27 driven by the second driving portion 103c; and a supporting member 103e supporting these components.

The first driving portion 103a is adapted to be connected with the end of the driving-gear support shaft 38 and to be released from the connection. The driving-gear support shaft 38 can be rotated by means of the first driving portion 103a.

The first measurement portion 103b includes a rotation angle sensor so as to be able to measure the rotation-angle position of the first driving portion 103a.

The second driving portion 103c is adapted to be connected with an end of the rack bar 14 and to be released from the connection. The rack bar 14 can be rotated by means of the second driving portion 103c. The rack bar 14 and the driven-gear support shaft 62 may be rotated together by rotating the rack bar 14 while inhibited from moving in the axial direction S3 thereof. Alternatively, a restricting member (not shown) as a jig for restricting the relative rotation between the rack bar 14 and the driven-gear support shaft 62 may be interposed between these components 14, 35 during adjustment so that the rack bar 14 and the driven-gear support shaft 62 may be rotated together. After completion of the adjustment, the restricting member may be removed.

The second measurement portion 103d includes a rotation angle sensor so as to be able to measure the rotation-angle position of the second driving portion 103c.

The backlash adjustment using the above jigs 101, 102, 103 is described with reference to FIG. 16, FIG. 17A and FIG. 17B.

First, the unit 73 as a unit assembly is assembled. In the unit 73, the intermediate gear 26 is fixed to the intermediate-gear support shaft 46. Specifically, as shown in FIG. 18, the restricting member 102 is threaded into the screw hole of the restricting-member mounting portion 72, so that the projection 102c of the restricting member 102 is abutted against the recess 55e of the intermediate gear 26.

Referring to FIG. 16, the housing body 31 of the unit 73 is fixed to the fixing portion 104 of the rotating jig 101. The coupling portion 59 of the unit 73 is coupled to the output shaft 105e of the rotating jig 101. The driving-gear support shaft 38 of the unit 73 is coupled to the first driving portion 103a of the measurement jig 103. The rack bar 14 of the unit 73 is coupled to the second driving portion 103c of the measurement jig 103.

Referring to FIG. 15A and FIG. 16, the output shaft 105e is fixed by means of the restricting portion 106 so as to restrict the rotation of the intermediate-gear support shaft 46. In this state, the driving gear 25 is rotated in both directions by means of the first driving portion 103a. The maximum angular amount (the angular range) is measured that the driving gear 25 is allowed to rotate. For instance, a difference between a rotation-angle position defining an end of the rotation of the driving gear 25 in one direction and a rotation-angle position defining an end of the rotation of the driving gear 25 in the other direction is determined. This difference is equivalent to the aforementioned angular amount as well as to the amount proportional to the backlash between the driving gear 25 and the intermediate gear 26. Similarly, the maximum angular amount (the angular range) is measured that the driven gear 27 is allowed to rotate. This angular amount is proportional to the backlash between the driven gear 27 and the intermediate gear 26.

Then, the angular amount corresponding to the backlash between the driving gear 25 and the intermediate gear 26 is compared with the angular amount corresponding to the backlash between the driven gear 27 and the intermediate gear 26, for example. The rotational position of the intermediate-gear support shaft 46 is adjusted in a manner that the smaller angular amount takes a predetermined minimum value or a value within a predetermined range. Specifically, the inhibition of the relative rotation between the intermediate gear 26 and the intermediate-gear support shaft 46 is cancelled and the intermediate-gear support shaft 46 is rotated by a predetermined angle by means of the rotating portion 105 of the rotating jig 101.

Next, in the state where the intermediate gear 26 is inhibited from rotating in the same procedure as the above, the angular amount corresponding to the backlash between the driving gear 25 and the intermediate gear 26, and the angular amount corresponding to the backlash between the driven gear 27 and the intermediate gear 26 are measured. If the measurement values are within the predetermined range, the adjustment is completed.

Referring to FIG. 16 and FIG. 13, the coupling between the output shaft 105e of the rotating jig 101 and the coupling portion 59 is maintained and the rotation of the output shaft 105e is inhibited by the restricting portion 106 when the adjustment is completed. In this state, the fastening member 541 is fastened to the intermediate-gear support shaft 46 of the unit 73. In this manner, the intermediate-gear support shaft 46 is fixed.

Subsequently, the individual jigs 101, 103 are removed from the unit 73. Further, the restricting member 102 is removed from the restricting-member mounting portion 72 so that the intermediate gear 26 fixed to the intermediate-gear support shaft 46 is released from the fixed state.

With reference to FIG. 1, FIG. 5 and FIG. 13, in the electric power steering apparatus 1 according to the embodiment in which the output from the electric motor 18 is transmitted to the steering mechanism 5 via the driving gear 25 the intermediate gear 26 and the driven gear 27 in this order rotatably supported by the housing body 31, the electric power steering apparatus 1 includes the eccentric mechanism 53 which moves the intermediate gear 26 toward the driving gear 25 and the driven gear 27 in parallel to the center axes 25a, 27a of these gears 25, 27, thereby eccentrically locating the intermediate gear 26. The eccentric mechanism 53 includes the intermediate-gear support shaft 46 which is supported by the entry aperture 34h as the first circle hole and the support hole 34i as the second circle hole of the above housing body 31 in a manner to be position-adjustable. This intermediate-gear support shaft 46 is characterized by including the center axis 46d, the outer periphery 58 and the eccentric portion 58c provided at the outer periphery 58 for rotatably supporting the intermediate gear 26 eccentric to the center axis 46d.

In the eccentric mechanism 53 according to the embodiment, the center axis of the eccentric portion 58c on the outer periphery 58 of the intermediate-gear support shaft 46 is moved along the arcuate path, as viewed in the axial direction S2, when the intermediate-gear support shaft 46 is rotated about the center axis 46d thereof with respect to the housing body 31. At this time, the center axis (equivalent to the center axis 26a of the intermediate gear 26) of the eccentric portion 58c is maintained in parallel to the center axis 25a of the driving gear 25 and the center axis 27a of the driven gear 27.

Consequently, the center axis 26a of the intermediate gear 26 may be moved in parallel to the center axis 25a of the driving gear 25 and the center axis 27a of the driven gear 27. This allows at least one of the backlash between the driving gear 25 and the intermediate gear 26 and the backlash between the intermediate gear 26 and the driven gear 27, for example, to be adjusted and optimized. Therefore, the occurrence of rattle (rattling noises) caused by the backlash may be restrained.

Unlike the case where the intermediate-gear support shaft 46 is supported by means of the conventional elongate hole, there is no need for providing a clearance as an adjustment allowance for the parallel movement of the intermediate gear between the outer periphery of the intermediate-gear support shaft 46 and the portions supporting the shaft (equivalent to the first and second circle holes 34h, 34i). As a result, the center axes 25a, 26a, 27a of the gears 25, 26, 27 are less liable to incline to each other. This leads to the reduction of teeth sliding noises in meshing engagement. Since the rattling noises and the teeth sliding noises in meshing engagement may be reduced by adjusting the rotational position of the intermediate-gear support shaft 46, manufacturing labor may be dramatically reduced as compared with the conventional matching assembly process.

These effects by the eccentric mechanism 53 may be obtained in both cases where the housing body 31 comprises plural parts and where the housing body comprises a single item as shown in the above embodiment. However, the case where the housing body 31 comprises a single item is preferable to reduce the gear sliding noises of the teeth in meshing engagement because the center axes 25a, 26a, 27a of the gears 25, 26, 27 are less liable to incline relative to each other.

Referring to FIG. 5 and FIG. 13, it is preferred to provide the fastening member 541 for restricting the rotation of the intermediate-gear support shaft 46 adjusted in the rotational position thereof. In this case of the intermediate gear 26 may be the center axis 26a fixed to position adjusted to the center axis 25a of the driving gear 25 and the center axis 27a of the driven gear 27, so that the backlashes can be maintained in the adjusted state, for example, in the reduced state. Consequently, the occurrence of the rattling noises may be assuredly prevented.

Referring to FIG. 15A and FIG. 15B, the first plane P1 including the center axis 46a of the intermediate-gear support shaft 46 and the center axis 26a of the intermediate gear 26 intersects the second plane P2 at an angle in a range DA of 0 to 30° (0≦DA≦30°) that intersecting the fifth plane P5 (the predetermined angle-bisecting plane) at right angles. As described above, the fifth plane P5 (the predetermined angle-bisecting plane) is the plane which bisects the angle DC formed between the third plane P3 including the center axis 25a of the driving gear 25 and the center axis 26a of the intermediate gear 26 and the fourth plane P4 including the center axis 27a of the driven gear 27 and the center axis 26a of the intermediate gear 26 to pass the center axis 46d of the intermediate-gear support shaft 46.

According to this constitution, both the backlash between the intermediate gear 26 and the driving gear 25 and the backlash between the intermediate gear 26 and the driven gear 27 are decreasingly or increasingly adjusted when the intermediate-gear support shaft 46 is rotated in one direction for adjustment of the rotational position thereof. Therefore, the occurrence of the rattling noises is much more restrained. In addition, the adjustment for optimizing the backlashes is easy. For obtaining this effect the adjustable range of the angular position of the intermediate-gear support shaft 46 may include at least some of the angular positions within the aforementioned range DA.

Referring to FIG. 13, the housing body 31 includes the entry aperture 34h as the first circle hole having the larger diameter than that of the intermediate gear 26. The first end 46a as one end of the intermediate-gear support shaft 46 is provided with the end plate 47 rotatable together with the intermediate-gear support shaft 46. The outer periphery 47a of the end plate 47 is adapted to include the fit-engagement portion 47d to be fitted in the entry aperture 34h as the first circle hole. In this case, the fit-engagement portion 47d has such a large diameter that the center axis 46d of the intermediate-gear support shaft 46 is less prone to inclination. Through the entry aperture 34h as the large-sized aperture of the housing body 31, the intermediate gear 26 may be easily assembled in the second tubular portion 34 of the housing body 31. Since the intermediate-gear support shaft 46 may be highly rigidly supported on both ends thereof, the individual gears 25, 26, 27 may be assuredly positioned in parallel to each other.

Referring to FIG. 16, the end plate 47 is provided with the restricting-member mounting portion 72 to which the restricting member 102 for restricting the relative rotation of the intermediate-gear support shaft 46 and the intermediate gear 26 can be fixed when the rotational position of the intermediate-gear support shaft 46 is adjusted. This ensures that the rotation of the intermediate gear 26 is positively inhibited when, for example, the rotation of the intermediate-gear support shaft 46 is halted. At this time, the backlash between the driving gear 25 and the intermediate gear 26, for example, may be easily measured by rotating the driving gear 25. Hence, this backlash may be adjusted to the optimum value. Similarly, the backlash between the driven gear 27 and the intermediate gear 26 may also be measured so that this backlash may be adjusted to the optimum value.

According to the embodiment, as shown in FIG. 16, the intermediate-gear support shaft 46 is provided with the coupling portion 59 at the first end 46a that is capable of coupling the intermediate-gear support shaft 46 to the rotating jig 101 for adjusting the rotational position of the intermediate-gear support shaft 46. In this case, the intermediate-gear support shaft 46 having the coupling portion 59 coupled to the jig 101 may be easily rotated using the jig 101. Accordingly, the backlash may be easily adjusted.

Referring to FIG. 13, the elastic O ring 60 is interposed between the inner periphery 61a of the entry aperture 34h as the first circle hole of the housing body 31 and the fit-engagement portion 47d of the outer periphery 47a of the end plate 47. In this case, while a gap between the inner periphery 61a of the entry aperture 34h and the fit-engagement portion 47d of the outer periphery 47a is secured having such dimensions as to provide easy assembly, the intermediate-gear support shaft 46 may be more assuredly prevented from inclining to the center axes of the entry aperture 34h and the support hole 34i by virtue of an aligning action of the elastic support using the O ring. As a result, the center axes 25a, 26a, 276a of the three gears 25, 26, 27 may be prevented from inclining to each other. Further, a sealing effect can be obtained by the O ring 60.

Referring to FIG. 4, the rack bar 14 is provided in concentric relation with the driven gear 27. The housing body 31 includes the extension portion 70 of the third tubular portion 35 as the tubular portion, through which the rack bar 14 is inserted. The end plate 47 includes the outside circumference end portion 47j as a covering portion for covering the portion 34d1 which is a part of the end face 34d constituting the marginal portion of the entry aperture of the housing body 31. Both the extension portion 70 and the outside circumference end portion 47j are individually provided with the concave portion 70c and the notch 47g1 as the relief portion for preventing interfering with each other corresponding to the predetermined rotational-position range DB (see FIG. 15A) of the intermediate-gear support shaft 46 when the rotational position of the intermediate-gear support shaft 46 is adjusted. In this case it is possible to prevent the mutual interference between the extension portion 70 of the third tubular portion 35 and the outside circumference end portion 47j of the end plate 47. Therefore, it is possible to widen the adjustable range of the rotational position of the intermediate-gear support shaft 46, thus facilitating the backlash adjustment. There is no need for increasing a distance between the extension portion 70 as the tubular portion and the end plate 47 not to cause the mutual interference, thus it is also possible to downsize the housing body 31.

Referring to FIG. 13, the support hole 34i as the second circle hole of the housing body 31 supports the portion 46f adjoining the second end 46b as the other end of the intermediate-gear support shaft 46. In this case, the intermediate-gear support shaft 46 may be stably supported at the both ends thereof so that the inclination of the intermediate-gear support shaft 46 may be much more prevented.

Referring to FIG. 13, the rotation restricting member includes the fastening member 541 for fastening the second end 46b as the other end of the intermediate-gear support shaft 46 to the housing body 31. In this case, the intermediate-gear support shaft 46 is fixed to the housing body 31 while maintaining the state where the intermediate-gear support shaft 46 is adjusted to any rotational position.

Referring to FIG. 4, FIG. 5, FIG. 12, FIG. 13 and FIG. 14, the housing body 31 comprising a single item is integrally formed with the following cylindrical surfaces for positioning the respective center axes 25a, 26a, 27a of the individual gears 25, 26, 27, that is, the second portion 45b of the inner periphery 45 as a bearing retaining surface of the first tubular portion 33, the support hole 34i of the second tubular portion 34, the entry aperture 34h of the second tubular portion 34 and the fifth portion 68e of the inner periphery 68 as a bearing retaining surface of the third tubular portion 35. This preferably allows to restrict generation of inclination with respect to the center axes 25a, 26a, 27a of respective gears 25, 26, 27 to each other.

In addition, since a pair of parallel end faces 34d, 34e as fixing surfaces for fixing the intermediate-gear support shaft 46 at position after the positional adjustment are formed integrally with the foregoing surfaces for positioning, it is possible to prevent the inclination in the fixed state.

The end face 34d as one of the paired parallel surfaces has the larger diameter whereas the other end face 34e has the smaller diameter. Therefore, the orientation of the center axis 46d of the intermediate-gear support shaft 46 is principally restricted by the end face 34d as the marginal portion of the entry aperture 34h having the large diameter. Hence, the fastening member 541 may cause the inclination to the intermediate-gear support shaft 46 when the fastening member 541 in an abutted state as abutted against the end face 34e having the smaller diameter is threadedly engaged with the intermediate-gear support shaft 46.

The second portion 45b of the inner periphery 45 as the bearing retaining surface of the first tubular portion 33, the inner periphery of the entry aperture 34h of the second tubular portion 341 and the fifth portion 68e of the inner periphery 68 as the bearing retaining surface of the third tubular portion 35 have the larger diameters than the corresponding gears 25, 26, 27, respectively. Therefore, it is preferable to restrain the inclinations of the gears.

The bearings 39, 40 for supporting the driving-gear support shaft 38 are different bodies from each other and disposed plural. It is therefore easy to secure a long axial distance between the ball rows of the bearings 39, 40. In addition, the axial distance between the ball rows of the paired bearings 39, 40 is defined to be equal to or larger than an inside diameter of the second portion 45b of the inner periphery 45 as the bearing retaining surface of the first tubular portion 33 which supports the driving-gear support shaft 38. This allows to support the driving-gear support shaft 38 in a stable manner, thus contributes to the prevention of the inclination of the driving gear 25 and the intermediate gear 26.

The end plate 47 includes the notch 47g2 having the same shape as that of the notch 47g1 and disposed on the radially opposite side from the notch 47g1 as the relief portion. Thus, the end face 47h as the received portion of the end plate 47 is radially symmetrically disposed with respect to the center axis 46d, so that the end plate is capable of receiving a fastening force in a balanced manner. Therefore, it is possible to resist inclination at the time of fastening.

The following modifications of the embodiment may be possible. The following description focuses on differences from the above embodiment, and same parts will be represented by the numerical references respectively, the description of which is omitted. For instance, the driving gear 25, the intermediate gear 26 and the driven gear 27 may be spur gears meshed with each other.

Figure 19:
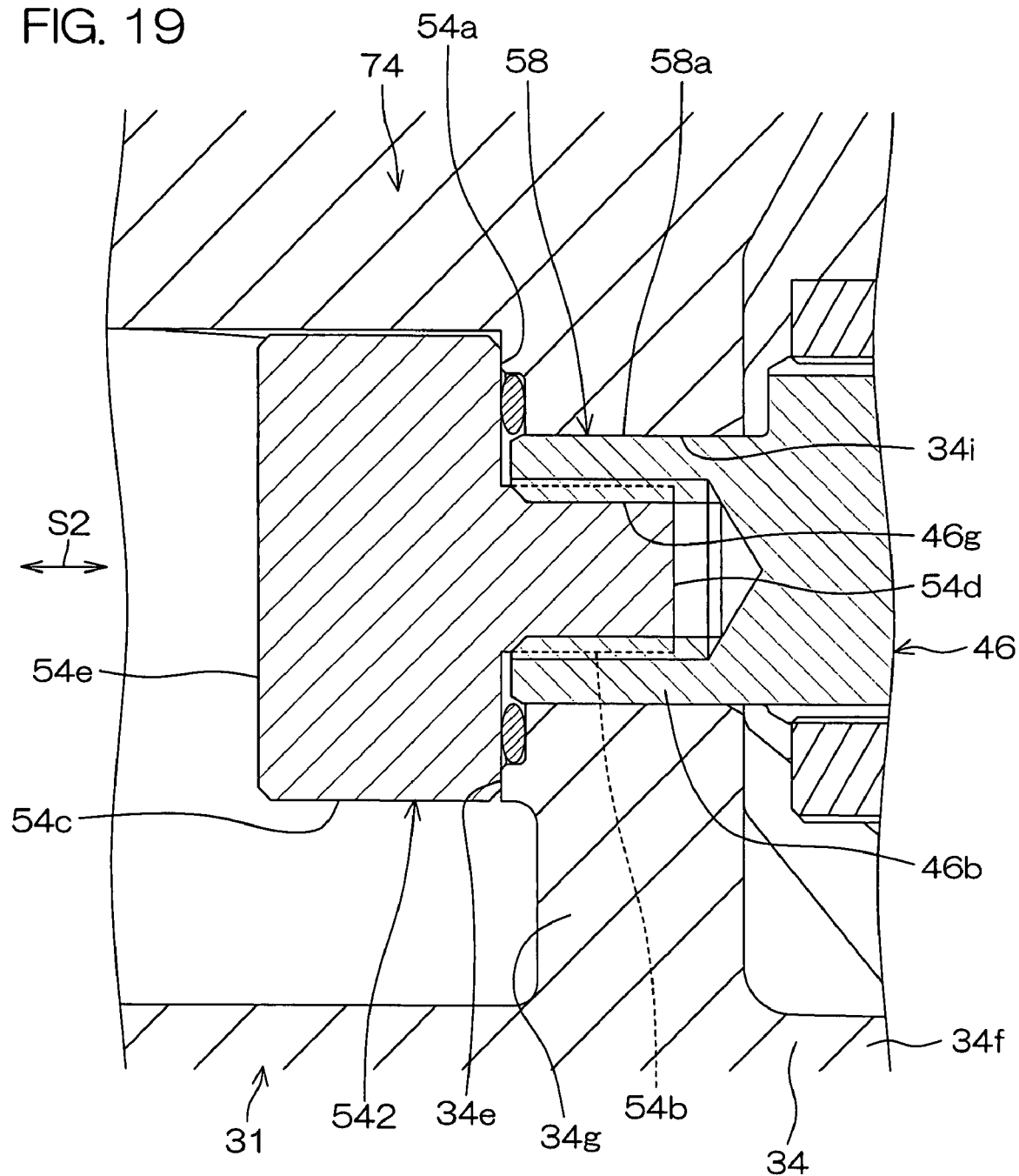
FIG. 19 is a sectional view showing an exemplary modification of a fastening member shown in FIG. 13.

FIG. 19 is a sectional view showing an exemplary modification of the fastening member shown in FIG. 13. Referring to FIG. 19, a fastening member 542 is a bolt including a shaft 54d formed with a male thread, and a large-diameter head 54e formed at an end of the shaft 54d and including the tool engaging portion 54c. Specifically, the second end 46b of the intermediate-gear support shaft 46 is formed with a screw hole, an inner periphery of which is formed with a female thread as an engaging portion 46g2. The male thread as the engaging portion 54b of the fastening member 542 comprising the bolt is threaded into this female thread. Similarly to the aforementioned fastening member 541 comprising the nut, it is possible to fasten the intermediate-gear support shaft 46 to the housing body 31.

In FIG. 19, the support hole 34i supports the second end 46b of the intermediate-gear support shaft 46. In this case as well, the support hole 34i can support the intermediate-gear support shaft 46 as stably as in the aforementioned case where the support hole 34i supports the portion 46f adjoining the second end 46b thereof.

The fastening mechanism 74 may be possible to a fix only the end plate 47 to the second tubular portion 34.

In the foregoing embodiments, it is also possible that the outside circumference end portion 47j as the covering portion of the end plate 47 covers the overall area of the end face 34d as the marginal portion of the entry aperture 34h of the housing body 31. In a case where the extension portion 47f of the outside circumference end portion 47*j* is formed in an annular shape endlessly continued in the circumferential direction thereof, for example, the overall area of the end face 34*d* may be covered. In short, it is sufficient when the outside circumference end portion 47*j* covers at least a part of the end face 34*d*.

In the case where the outside circumference end portion 47*j* covers at least a part of the end face 34*d*, the outside circumference end portion 47*j* may be increased in size in the radial direction so that the outside circumference end portion 47*j* may interfere with the third tubular portion 35. In the foregoing embodiment the relief portions for avoiding the interference are provided at the outside circumference end portion 47*j* and the third tubular portion 35, it is also possible to provide the relief portion at least of either one of the outside circumference end portion 47*j* and the third tubular portion 35. In short, it is sufficient when the relief portion is provided at least of one of the outside circumference end portion 47*j* and the third tubular portion 35. In this case, the backlash adjustment can be adjusted as easily as in the foregoing embodiment.

If the adjustment of the rotational position of the intermediate-gear support shaft 46 has no difficulty, the aforementioned relief portion may be dispensed with.

In the foregoing embodiments, a circumferential groove may be formed in the inner periphery of the entry aperture 34*h* of the second tubular portion 34 to fit the O ring 60 in this circumferential groove. In this case, the circumferential groove of the fit-engagement portion 47*d* of the outer periphery 47*a* of the end plate 47 may be omitted. In short, it is sufficient when the elastic O ring 60 is interposed between the fit-engagement portion 47*d* of the outer periphery 47*a* of the end plate 47 and the inner periphery of the entry aperture 34*h* of the second tubular portion 34. It is also possible to omit the O ring 60.

In the foregoing embodiments, the coupling portion 59 may be provided at the end plate 47 rotatable together with the intermediate-gear support shaft 46. The intermediate-gear support shaft 46 may be easily rotated by connecting a corresponding jig (not shown) to the coupling portion 59 on the end plate 47.

It is also possible that after completion of the adjustment operation by means of the eccentric mechanism 53, the restricting member 102 while mounted to the restricting-member mounting portion 72 is fixed to a place that allows the relative rotation between the intermediate-gear support shaft 46 and the intermediate gear 26. It may also be possible to omit the restricting-member mounting portion 72.

In the foregoing embodiments, it is also possible that the intermediate-gear support shaft 46 and the end plate 47 are formed in independent bodies to fix to each other by fit engaging with each other in concentric relation. It is also possible to fit engage the intermediate-gear support shaft 46 and the end plate 47 in the independent bodies with each other in concentric relation in a manner to be rotatable relative to each other. In this case, the end plate 47 is fixed to the housing body 31 and the intermediate-gear support shaft 46 is rotated to the endplate 47 when the rotational position of the intermediate-gear support shaft 46 is adjusted. After the adjustment, the intermediate-gear support shaft 46 and the end plate 47 are fixed to each other.

In the foregoing embodiments, the second plane P2 in the eccentric mechanism 53 is defined to be the plane orthogonal to the fifth plane P5 (equivalent to the predetermined angle-bisecting plane) and including the center axis 26*a* of the intermediate gear 26. Alternatively, the second plane P2 may also be defined to be the plane orthogonal to the fifth plane P5 (equivalent to the predetermined angle-bisecting plane) and passing the center axis 46*a* of the intermediate-gear support shaft 46. The second plane of this case may also be handled in the same way as the second plane P2 described in the foregoing embodiment.

In the foregoing embodiments, it is possible that the first plane P1 intersects the second plane P2 at an angle beyond the range DA in the eccentric mechanism 53. This allows to move the intermediate gear 26 eccentrically located by moving the intermediate gear 26 toward either one of the driving gear 25 and the driven gear 27 in parallel to the center axes 25*a*, 27*a* of these gears.

In a case where the intermediate gear 26 is eccentrically located by way of parallel movement only toward the driving gear 25, for example, the backlash between the driving gear 25 and the intermediate gear 26 may be adjustively decreased. This contributes to reduce the ratting noises of the overall reduction gears. Likewise, the rattling noises may also be reduced by moving the intermediate gear 26 in parallel only toward the driven gear 27. Out of the backlashes between the individual gears 25, 26, 27, a backlash significantly affecting the rattling noises of the overall reduction gears 19 may be positively reduced. In short, it is sufficient when the eccentric mechanism 53 is adapted to eccentrically locate the intermediate gear 26 by moving the intermediate gear 26 toward at least one of the driving gear 25 and the driven gear 27 in parallel to the center axis 25*a*, 27*a* of the gear 25, 27.

In each foregoing embodiment, it is also possible that the intermediate-gear support shaft 46 adjusted in position is fixed by the housing body 31 by processing. In this case, the rotation restricting member can be omitted.

While the invention has been described in details with reference to the specific embodiments thereof, it is to be understood that changes, modifications and equivalents will occur to those skilled in the art who have understood the above contents. The scope of the invention, therefore, should be defined by the appended claims and their equivalents.

The present application is in correspondence to Japanese Patent Application No. 2006-176867 filed with Japanese Patent Office on Jun. 27, 2006, and the whole disclosure thereof is incorporated herein by reference.

The invention claimed is:

1. An electric power steering apparatus comprising:
an electric motor for steering assist;
a transmission mechanism for transmitting an output from the electric motor to a steering mechanism, the transmission mechanism including a driving gear having a center axis, a driven gear having a center axis, and an intermediate gear meshed with the driving gear and with the driven gear, the intermediate gear having a center axis disposed in parallel to the center axis of the driving gear and the center axis of the driven gear;
a housing accommodating the transmission mechanism therein; and
an eccentric mechanism for eccentrically locating the intermediate gear in order that the center axis of the intermediate gear is moved toward at least one of the center axis of the driving gear and the center axis of the driven gear while maintaining the parallel relation,
wherein the housing is formed with first and second circle holes, the first and second circle holes have center axes aligned coaxially with each other;
the eccentric mechanism includes an intermediate-gear support shaft having a center axis;
the intermediate-gear support shaft is supported by the first and second circle holes of the housing in a manner to be rotatable about its center axis of the intermediate-gear support shaft for adjustment of a rotational position thereof;

the intermediate-gear support shaft includes an outer periphery;

the outer periphery of the intermediate-gear support shaft includes an eccentric portion comprising a cylindrical surface eccentric to the center axis of the intermediate-gear support shaft; and the intermediate gear is rotatably supported by the eccentric portion wherein the intermediate-gear support shaft includes first and second ends; the first end of the intermediate-gear support shaft is provided with an end plate rotatable together with the intermediate-gear support shaft; the end plate includes an outer periphery; the outer periphery of the end plate includes a fit-engagement portion removably fitted in the first circle hole; and an inside diameter of the first circle hole is larger than an outside diameter of the intermediate gear.

2. The electric power steering apparatus according to claim 1, further comprising a rotation restricting member for releasably restricting the rotation of the intermediate-gear support shaft.

3. The electric power steering apparatus according to claim 2, wherein the rotation restricting member includes a fastening member for fastening the second end of the intermediate-gear support shaft to the housing.

4. The electric power steering apparatus according to claim 3, wherein an engaging portion comprising a thread is formed at the second end of the intermediate-gear support shaft, and the fastening member includes a bolt or a nut which is abutted against a predetermined portion of the housing while engaged with the engaging portion.

5. The electric power steering apparatus according to claim 1, wherein a first plane, a second plane, a third plane, a fourth plane and a fifth plane are provided;

the first plane includes the center axis of the intermediate-gear support shaft and the center axis of the intermediate gear;

the third plane includes the center axis of the driving gear and the center axis of the intermediate gear;

the fourth plane includes the center axis of the driven gear and the center axis of the intermediate gear;

the fifth plane includes the center axis of the intermediate gear;

an angle formed between the third plane and the fifth plane is equal to an angle formed between the fourth plane and the fifth plane;

the second plane intersects the fifth plane at right angles; and the first plane intersects the second plane at an angle in a predetermined angular range.

6. The electric power steering apparatus according to claim 5, wherein the predetermined angular range ranges from 0° to 30°.

7. The electric power steering apparatus according to claim 1, wherein the end plate is provided with a restricting-member mounting portion allowing a restricting member serving to restrict relative rotation between the intermediate-gear support shaft and the intermediate gear to be fixed thereto when the rotational position of the intermediate-gear support shaft is adjusted.

8. The electric power steering apparatus according to claim 1, wherein the restricting-member mounting portion includes a screw hole provided in the end plate of the intermediate-gear support shaft;

the restricting member includes a bolt capable of being threaded into the screw hole;

an engaging portion disposed at a tip of the bolt threaded into the screw hole is engaged with a recess provided in a lateral side of the intermediate gear, whereby the relative rotation of the intermediate-gear support shaft and the intermediate gear is restricted.

9. The electric power steering apparatus according to claim 1, wherein a coupling portion capable of coupling to a jig for adjusting the rotational position of the intermediate-gear support shaft is provided at the first end or the end plate of the intermediate-gear support shaft.

10. The electric power steering apparatus according to claim 1, wherein an elastic O ring is interposed between an inner periphery of the first circle hole of the housing and the fit-engagement portion of the end plate.

11. The electric power steering apparatus according to claim 1, further comprising a rack bar extending along the center axis of the driven gear, wherein the housing includes a tubular portion through which the rack bar is inserted;

the end plate includes a covering portion for covering at least a part of an entry circumference end portion of the first circle hole of the housing; and a relief portion is provided at least one of the tubular portion and the covering portion, preventing the tubular portion and the covering portion from interfering with each other corresponding to a predetermined range of rotational position of the intermediate-gear support shaft when the rotational position of the intermediate-gear support shaft is adjusted.

12. The electric power steering apparatus according to claim 1, wherein the second circle hole of the housing supports the second end of the intermediate-gear support shaft or a portion adjoining the second end.

* * * * *